United States Patent
Li et al.

(10) Patent No.: US 10,820,345 B2
(45) Date of Patent: Oct. 27, 2020

(54) METHOD AND APPARATUS FOR DETERMINING CONTENTION WINDOW INFORMATION

(71) Applicant: Huawei Technologies Co., Ltd., Shenzhen (CN)

(72) Inventors: Yuan Li, Beijing (CN); Lei Guan, Beijing (CN); Sha Ma, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 168 days.

(21) Appl. No.: 16/054,140

(22) Filed: Aug. 3, 2018

(65) Prior Publication Data

US 2018/0352574 A1 Dec. 6, 2018

Related U.S. Application Data

(63) Continuation of application No. PCT/CN2016/101226, filed on Sep. 30, 2016.

(30) Foreign Application Priority Data

Feb. 4, 2016 (WO) ................ PCT/CN2016/073575

(51) Int. Cl.
*H04W 74/08* (2009.01)
*H04W 74/00* (2009.01)
(Continued)

(52) U.S. Cl.
CPC ....... *H04W 74/0808* (2013.01); *H04L 1/1812* (2013.01); *H04L 5/0055* (2013.01);
(Continued)

(58) Field of Classification Search
None
See application file for complete search history.

(56) References Cited

U.S. PATENT DOCUMENTS

| 2015/0085836 A1 | 3/2015 | Kang et al. |
| 2015/0103782 A1 | 4/2015 | Xu et al. |

(Continued)

FOREIGN PATENT DOCUMENTS

| CN | 103686838 A | 3/2014 |
| CN | 104205985 A | 12/2014 |

(Continued)

OTHER PUBLICATIONS

"Discussion on channel access framework for potential LAA UL," 3GPP TSG RAN WG1 Meeting #82bis, R1-155900, Malmö, Sweden, pp. 1-7, 3rd Generation Partnership Project, Valbonne, France (Oct. 5-9, 2015).

(Continued)

*Primary Examiner* — Ayaz R Sheikh
*Assistant Examiner* — Faiyazkhan Ghafoerkhan
(74) *Attorney, Agent, or Firm* — Leydig, Voit & Mayer, Ltd.

(57) ABSTRACT

Embodiments of the present disclosure provide a method for determining contention window information. The method includes: determining contention window information of a second uplink burst of a user equipment (UE) according to a receiving state of a reference subframe; generating at least one piece of control signaling for scheduling at least one uplink subframe in the second uplink burst; and sending the at least one piece of control signaling to the UE. According to the method and an apparatus for determining contention window information in the embodiments of the present disclosure, the control signaling is sent to the UE, so that the contention window information of the UE can be adjusted, the UE can obtain an appropriate contention window information, and fair channel access is implemented through channel sensing based on random backoff.

20 Claims, 19 Drawing Sheets

(51) Int. Cl.
*H04L 1/18* (2006.01)
*H04L 5/00* (2006.01)
*H04W 16/14* (2009.01)
*H04W 72/04* (2009.01)
*H04W 72/14* (2009.01)

(52) U.S. Cl.
CPC ....... *H04W 16/14* (2013.01); *H04W 72/0406* (2013.01); *H04W 72/0446* (2013.01); *H04W 72/14* (2013.01); *H04W 74/00* (2013.01)

(56) References Cited

U.S. PATENT DOCUMENTS

| | | | | |
|---|---|---|---|---|
| 2015/0257174 | A1* | 9/2015 | Liu | H04W 24/08 370/235 |
| 2015/0351115 | A1 | 12/2015 | Jeon et al. | |
| 2016/0212767 | A1* | 7/2016 | Yin | H04W 24/08 |
| 2016/0278088 | A1* | 9/2016 | Cheng | H04W 28/18 |
| 2016/0309512 | A1* | 10/2016 | Li | H04W 74/0816 |
| 2016/0345326 | A1* | 11/2016 | Yerramalli | H04W 76/28 |
| 2016/0366689 | A1* | 12/2016 | Zhang | H04W 16/14 |
| 2017/0005768 | A1* | 1/2017 | Yin | H04W 74/02 |
| 2017/0019909 | A1* | 1/2017 | Si | H04W 76/28 |
| 2018/0063871 | A1* | 3/2018 | Cheng | H04W 74/004 |
| 2018/0124749 | A1* | 5/2018 | Park | H04W 74/08 |
| 2018/0227082 | A1* | 8/2018 | Harada | H04W 72/08 |
| 2018/0242360 | A1* | 8/2018 | Noh | H04L 1/1812 |
| 2018/0359772 | A1* | 12/2018 | Park | H04W 16/14 |
| 2019/0014594 | A1* | 1/2019 | Park | H04W 16/14 |
| 2019/0036831 | A1* | 1/2019 | Li | H04L 47/27 |
| 2019/0053274 | A1* | 2/2019 | Kim | H04W 74/00 |
| 2019/0150170 | A1* | 5/2019 | Park | H04W 72/1268 370/329 |
| 2019/0190679 | A1* | 6/2019 | Yerramalli | H04L 5/0055 |
| 2019/0297650 | A1* | 9/2019 | Cheng | H04W 72/0446 |
| 2019/0342915 | A1* | 11/2019 | Kim | H04W 72/0406 |
| 2020/0037362 | A1* | 1/2020 | Noh | H04L 1/1812 |

FOREIGN PATENT DOCUMENTS

| | | |
|---|---|---|
| CN | 104254137 A | 12/2014 |
| CN | 105101446 A | 11/2015 |
| WO | 2015187565 A1 | 12/2015 |

OTHER PUBLICATIONS

"Contention window size adaptation for DL LBT in LAA," 3GPP TSG RAN WG1 Meeting #82, Beijing, China, R1-154317, 3rd Generation Partnership Project, Valbonne, France (Aug. 24-28, 2015).

"Discussion on LBT for UL transmission," 3GPP TSG RAN WG1 Meeting #83, Anaheim, USA, R1-156768, 3rd Generation Partnership Project, Valbonne, France, (Nov. 15-22, 2015).

"Discussion on the UL LBT for LAA," 3GPP TSG RAN WG1 Meeting #83, Anaheim, USA, R1-156993, 3rd Generation Partnership Project, Valbonne, France, (Nov. 15-22, 2015).

"3rd Generation Partnership Project; Technical Specification Group Radio Access Network; Evolved Universal Terrestrial Radio Access (E-UTRA); Physical layer procedures(Release 13)," 3GPP TS 36.213 V13.0.1, pp. 1-326, 3rd Generation Partnership Project, Valbonne, France (Jan. 2016).

"Description of candidate LBT schemes," 3GPP TSG RAN WG1 Ad-hoc Meeting, Paris, France, R1-150978, pp. 1-9, 3rd Generation Partnership Project—Valbonne, France (Mar. 24-26, 2015).

"Discussion on UL CWS adjustment for eLAA," 3GPP TSG RAN WG1 Meeting #86bis, Lisbon, Portugal, R1-1608659, pp. 1-3, 3rd Generation Partnership Project—Valbonne, France (Oct. 10-14, 2016).

"Other issues related to LBT for eLAA", 3GPP TSG RAN WG1 84 Meeting, St Julian's, Malta, R1-160741, pp. 1-5, 3rd Generation Partnership Project—Valbonne, France (Feb. 15-19, 2016).

"Remaining Details of Single-Carrier LBT", 3GPP TSG RAN WG1 Meeting #83, Anaheim, USA, R1-157013, pp. 1-6, 3rd Generation Partnership Project—Valbonne, France (Nov. 15-22, 2015).

"Discussion on channel access framework for potential LAA UL," NTT Docomo, Inc., 3GPP TSG RAN WG1 Meeting #83, Anahem, USA, R1-157220, pp. 1-6, 3rd Generation Partnership Project—Valbonne, France (Nov. 15-22, 2015).

"Control Signaling for LAA," Alcatel-Lucent et al.,R1-152995, 3GPP TSG RAN WG1 Meeting #81,Fukuoka, Japan, pp. 1-6, 3rd Generation Partnership Project—Valbonne, France (May 25-29, 2015).

"UL LBT for LAA," Huawei et al.,3GPP TSG RAN WG1 Meeting #82bis,Malmo, Sweden, R1-155099, pp. 1-4, 3rd Generation Partnership Project—Valbonne, France (Oct. 5-9, 2015).

* cited by examiner

All uplink subframes in a first uplink burst closest to
and before a scheduled and sent downlink subframe Last uplink subframe in a first uplink burst closest to
and before a scheduled and sent downlink subframe First uplink subframe in a first uplink burst closest to
and before a scheduled and sent downlink subframe

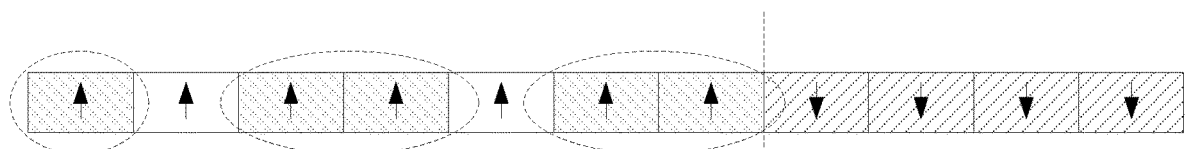

All uplink subframes in a plurality of
uplink bursts closest to and before a
scheduled and sent downlink subframe   FIG. 16(a)

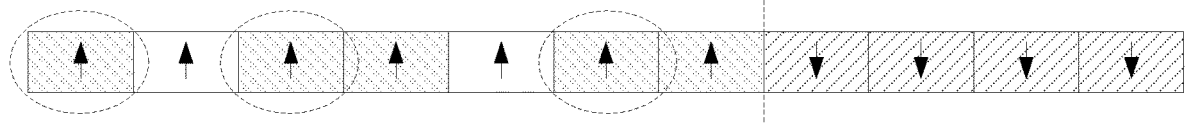

All start uplink subframes in a plurality
of uplink bursts closest to and before a
scheduled and sent downlink subframe   FIG. 16(b)

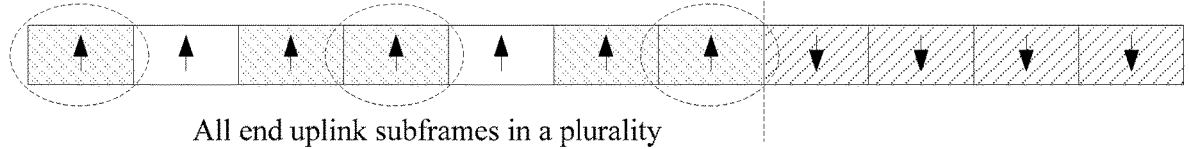

All end uplink subframes in a plurality
of uplink bursts closest to and before a
scheduled and sent downlink subframe

FIG. 16(c)

METHOD AND APPARATUS FOR DETERMINING CONTENTION WINDOW INFORMATION

CROSS-REFERENCE TO RELATED APPLICATIONS

This application is a continuation of International Application No. PCT/CN2016/101226 filed on Sep. 30, 2016, which claims priority to International Application No. PCT/CN2016/073575 filed on Feb. 4, 2016. All of the aforementioned patent applications are hereby incorporated by reference in their entireties.

TECHNICAL FIELD

The present disclosure relates to the communications field, and in particular, to a method and an apparatus for determining contention window information in the communications field.

BACKGROUND

In a licensed-assisted access using Long Term Evolution (LAA-LTE) system, an available spectrum may be extended to a 5 GHz unlicensed frequency band by using carrier aggregation (CA) technologies, then a licensed spectrum is used to implement seamless coverage and carry some services having a high delay requirement, and an unlicensed spectrum is used to carry some data services.

The unlicensed spectrum has advantages such as low costs and abundant bandwidths over the licensed spectrum. However, another wireless communications system such as an 802.11 system represented by Wi-Fi may work on a same unlicensed carrier. A Wi-Fi device and an LAA device cannot be planned and deployed together because they may not be configured by a same operator. In addition, these sending nodes may not be well isolated geographically. Consequently, radio signal interference between these sending nodes is more serious than interference between different devices of a same operator.

To implement friendly coexistence with another system such as a Wi-Fi system in the unlicensed spectrum, the LAA system may use a listen before talk (LBT) channel access mechanism, and detect a communication channel through clear channel assessment (CCA). When the communication channel is idle, a wireless communications device may occupy the communication channel to send information. When the communication channel is busy, the wireless communications device does not occupy the communication channel until other wireless communications devices stop occupying the communication channel.

In the Wi-Fi system and downlink transmission in LAA system, a sensing mechanism based on random backoff is used. Each time before sending data, a sending node first generates a random integer M between 1 and p, where the integer p is a contention window size (CWS), and then continuously performs channel sensing by using a sensing timeslot as a granularity. If detecting that a channel is idle in a current sensing timeslot, the sending node decreases M by one, until M is decreased to zero, and the sending node immediately sends a signal. In addition, the sending node dynamically adjusts the CWS according to received ACK/NACK information before the sensing, and may increase the CWS when network congestion is relatively serious, to alleviate a case of relatively serious interference caused by collision when different sending nodes back off and send information at the same time.

To implement fair resource sharing in the unlicensed spectrum and effective interference suppression, the sensing mechanism based on random backoff and a dynamically adjusted CWS may also be used in LAA uplink transmission. However, how to design a proper LAA uplink CWS adjustment solution is a problem that urgently needs to be resolved.

SUMMARY

Embodiments of the present disclosure provide a method and an apparatus for determining contention window information, to enable a user equipment (UE) to obtain appropriate contention window information, and implement fair channel access through channel sensing based on random backoff.

According to a first aspect, an embodiment of the present disclosure provides a method for determining contention window information. The method includes:

determining contention window information of a second uplink burst of a user equipment (UE) according to a receiving state of a reference subframe, where the contention window information includes a contention window size CWS, a contention window time, or signaling instructing the UE to trigger a CWS adjustment;

generating at least one piece of control signaling for scheduling at least one uplink subframe in the second uplink burst, where each of the at least one piece of control signaling includes the contention window information or a clear channel assessment (CCA) backoff counter initial value generated based on the contention window information; and sending the at least one piece of control signaling to the UE.

The reference subframe includes at least one uplink subframe in at least one first uplink burst of the UE, the first uplink burst is before the second uplink burst, the second uplink burst and the first uplink burst are discontinuous in time, the first uplink burst includes at least one uplink subframe, and the second uplink burst includes at least one uplink subframe.

Therefore, according to the method for determining contention window information in this embodiment of the present disclosure, the base station can determine the contention window information of the second uplink burst of the UE by using the receiving state of the reference subframe, so that the UE can obtain appropriate contention window information, and fair channel access can be implemented through channel sensing based on random backoff.

Optionally, the first uplink burst is a first uplink burst in which each uplink subframe is sent by the UE and scheduled by a base station.

Optionally, the first uplink burst is a first uplink burst in which each uplink subframe is sent by the UE and detected by a base station.

Optionally, the reference subframe is at least one uplink subframe sent by the UE and detected by the base station in the first uplink burst.

Optionally, the reference subframe is at least one uplink subframe whose receiving state has been detected by the base station in the first uplink burst.

Optionally, the reference subframe is at least one uplink subframe in each of at least one first uplink burst closest to the control signaling before the control signaling is sent to the UE.

Optionally, the reference subframe is at least one uplink subframe in each of the at least one first uplink burst closest to the control signaling within a predefined time window and before the control signaling is sent to the UE, where an end moment of the time window is a start moment at which the control signaling is sent to the UE.

Alternatively, the reference subframe is at least one uplink subframe in each of all first uplink bursts between a start moment at which a CWS of the first uplink burst changes and a moment at which the control signaling is sent, and before the control signaling is sent to the UE, where the first uplink burst whose CWS changes is a first uplink burst whose CWS changes and that is closest to the control signaling.

Optionally, the reference subframe is all uplink subframes, a first uplink subframe, or a last uplink subframe in each of the at least one first uplink burst.

Optionally, the determining contention window information of a second uplink burst of a user equipment (UE) includes:

when a receiving state of at least one uplink subframe in the reference subframe is NACK, increasing the CWS; otherwise, decreasing the CWS; or when a receiving state of each uplink subframe in the reference subframe is NACK, increasing the CWS; otherwise, decreasing the CWS.

Optionally, the determining contention window information of a second uplink burst of the UE further includes:

in the reference subframe, when a quantity of uplink subframes whose receiving states are NACK is greater than a first preset threshold, increasing the CWS; when a quantity of uplink subframes whose receiving states are NACK is less than the first preset threshold, decreasing the CWS; or when a quantity of uplink subframes whose receiving states are NACK is equal to the first preset threshold, increasing or decreasing the CWS; or in the reference subframe, when a percentage of a quantity of uplink subframes whose receiving states are NACK in a quantity of all uplink subframes is greater than a second preset threshold, increasing the CWS; when a percentage of a quantity of uplink subframes whose receiving states are NACK in a quantity of all uplink subframes is less than the second preset threshold, decreasing the CWS; or when a percentage of a quantity of uplink subframes whose receiving states are NACK in a quantity of all uplink subframes is equal to the second preset threshold, increasing or decreasing the CWS.

The first preset threshold and/or the second preset threshold may be predefined in a protocol. In this way, the adjustment of the CWS may be determined based on a value relationship with a predefined first preset threshold or second preset threshold without needing a complex calculation process, so that calculation costs are reduced, and efficiency can be improved.

Optionally, the method further includes:

determining a CWS of a third uplink burst of the UE according to the reference subframe before the CWS of the second uplink burst is determined; and determining that the CWS of the second uplink burst is equal to the CWS of the third uplink burst.

The first uplink burst, the second uplink burst, and the third uplink burst are discontinuous in time, the third uplink burst is between the first uplink burst and the second uplink burst, and the third uplink burst includes at least one uplink subframe.

According to a second aspect, an embodiment of the present disclosure provides a method for determining contention window information. The method includes:

receiving at least one piece of control signaling sent by a base station for scheduling at least one uplink subframe in a second uplink burst, where each of the at least one piece of control signaling includes contention window information, a clear channel assessment CCA backoff counter initial value generated based on the contention window information, or a hybrid automatic repeat request (HARQ) indication, and the contention window information includes a contention window size CWS, a contention window time, or signaling instructing a user equipment (UE) to trigger a CWS adjustment;

determining a CCA backoff counter initial value of the second uplink burst according to the at least one piece of control signaling; and performing CCA for the second uplink burst according to the CCA backoff counter initial value of the second uplink burst.

Optionally, the determining a CCA backoff counter initial value of the second uplink burst includes:

determining a CCA backoff counter initial value of a first uplink subframe of the second uplink burst according to contention window information included in control signaling closest to the second uplink burst and before the second uplink burst or a CCA backoff counter initial value generated based on the contention window information; or determining a CCA backoff counter initial value of a first uplink subframe of the second uplink burst according to contention window information included in control signaling of the first uplink subframe in the second uplink burst or a CCA backoff counter initial value generated based on the contention window information.

Optionally, the determining a CCA backoff counter initial value of the second uplink burst further includes:

determining a CWS of the second uplink burst according to a HARQ indication in the at least one piece of control signaling for at least one uplink subframe in a reference subframe; and determining the CCA backoff counter initial value of the second uplink burst according to the CWS of the second uplink burst.

The reference subframe includes at least one uplink subframe in at least one first uplink burst of the UE, the first uplink burst is before the second uplink burst, the second uplink burst and the first uplink burst are discontinuous in time, the first uplink burst includes at least one uplink subframe, and the second uplink burst includes at least one uplink subframe.

Optionally, the first uplink burst is a first uplink burst in which each uplink subframe is sent by the UE and scheduled by the base station.

Optionally, the first uplink burst is a first uplink burst in which each uplink subframe is sent by the UE.

Optionally, the reference subframe is at least one uplink subframe sent by the UE in the first uplink burst.

Optionally, the reference subframe is at least one uplink subframe whose receiving state is obtained by the UE in the first uplink burst.

Optionally, the reference subframe is at least one uplink subframe in each of at least one first uplink burst closest to the control signaling before the control signaling sent by the base station for the second uplink burst is received.

Optionally, the reference subframe is at least one uplink subframe in each of the at least one first uplink burst closest to the control signaling within a predefined time window and before the control signaling sent by the base station for the second uplink burst is received, where an end moment of the time window is a start moment at which the base station sends the control signaling to the UE.

Alternatively, the reference subframe is at least one uplink subframe in each of all first uplink bursts closest to the control signaling between a start moment at which a CWS of the first uplink burst changes and a moment at which the control signaling is sent, and before the control signaling sent by the base station for the second uplink burst is received, where the first uplink burst whose CWS changes is a first uplink burst whose CWS changes and that is closest to the control signaling before the control signaling sent by the base station for the second uplink burst is received.

Optionally, the reference subframe is at least one uplink subframe in each of at least one first uplink burst closest to a start moment at which the second uplink burst is sent, before the UE sends the second uplink burst.

Optionally, the reference subframe is at least one uplink subframe in each of the at least one first uplink burst closest to the start moment at which the second uplink burst is sent, within a predefined time window and before the UE sends the second uplink burst, where an end moment of the time window is a start moment of the second uplink burst of the UE.

Alternatively, the reference subframe is at least one uplink subframe in each of all first uplink bursts between a start moment at which a CWS of the first uplink burst changes and a start moment at which the second uplink burst is sent, and before the UE sends the second uplink burst, where the first uplink burst whose CWS changes is a first uplink burst whose CWS closest to the start moment of the second uplink burst changes, before the UE sends the second uplink burst.

Optionally, the reference subframe is at least one uplink subframe in each of at least one first uplink burst closest to a predefined moment before the predefined moment, and the predefined moment is before a start moment of the second uplink burst.

Optionally, the reference subframe is at least one uplink subframe in each of at least one first uplink burst closest to the predefined moment within a predefined time window, and an end moment of the predefined time window is the predefined moment.

Alternatively, the reference subframe is at least one uplink subframe in each of all first uplink bursts between a start moment at which a CWS of the first uplink burst changes and the predefined moment before the predefined moment, where the first uplink burst whose CWS changes is a first uplink burst whose CWS closest to the predefined moment changes before the predefined moment.

Optionally, the reference subframe is all uplink subframes, a first uplink subframe, or a last uplink subframe in each of the at least one first uplink burst.

Optionally, the determining a CWS of the second uplink burst includes:

when the HARQ indication for the at least one uplink subframe in the reference subframe is received, and at least one HARQ indication is a retransmission indication, increasing the CWS;

when a HARQ indication for each uplink subframe in the reference subframe is received, and each HARQ indication is an initial transmission indication, decreasing the CWS;

when no HARQ indication for each uplink subframe in the reference subframe is received, but the HARQ indication for the at least one uplink subframe in the reference subframe is received, and each HARQ indication is an initial transmission indication, maintaining the CWS unchanged or decreasing the CWS; or when the HARQ indication for the at least one uplink subframe in the reference subframe is not received, maintaining the CWS unchanged or decreasing the CWS.

Optionally, the determining a CWS of the second uplink burst further includes:

when the HARQ indication for the at least one uplink subframe in the reference subframe is received, and a quantity of uplink subframes whose HARQ indications are retransmission is greater than or equal to a first preset threshold, increasing the CWS;

when the HARQ indication for the at least one uplink subframe in the reference subframe is received, and a percentage of a quantity of uplink subframes whose HARQ indications are retransmission in a quantity of all uplink subframes in the reference subframe is greater than or equal to a second preset threshold, increasing the CWS;

when the HARQ indication for the at least one uplink subframe in the reference subframe is received, and a quantity of uplink subframes whose HARQ indications are initial transmission is greater than or equal to a third preset threshold, decreasing the CWS;

when the HARQ indication for the at least one uplink subframe in the reference subframe is received, and a percentage of a quantity of uplink subframes whose HARQ indications are initial transmission in a quantity of all uplink subframes in the reference subframe is greater than or equal to a fourth preset threshold, decreasing the CWS; or when the HARQ indication for the at least one uplink subframe in the reference subframe is not received, maintaining the CWS unchanged or decreasing the CWS.

Optionally, the method further includes: determining a CWS of a third uplink burst of the UE according to the reference subframe before the CWS of the second uplink burst is determined; and determining that the CWS of the second uplink burst is equal to the CWS of the third uplink burst.

The first uplink burst, the second uplink burst, and the third uplink burst are discontinuous in time, the third uplink burst is between the first uplink burst and the second uplink burst, and the third uplink burst includes at least one uplink subframe.

Optionally, a time interval between the at least one uplink subframe in the third uplink burst and a first uplink subframe in the second uplink burst is less than first preset duration.

Optionally, a moment at which the UE receives uplink grant UL grant is earlier than the at least one uplink subframe in the third uplink burst.

Alternatively, a moment at which the UE receives UL grant is not earlier than the at least one uplink subframe in the third uplink burst, and a time interval between the at least one uplink subframe in the third uplink burst and the moment at which the UE receives the UL grant is less than second preset duration.

The UL grant is UL grant that is closest to the second uplink burst before the second uplink burst and that is received by the UE.

According to a third aspect, an apparatus for determining contention window information is provided, including: a determining unit, configured to determine contention window information of a second uplink burst of a user equipment (UE) according to a receiving state of a reference subframe, where the contention window information includes a contention window size CWS, a contention window time, or signaling instructing the UE to trigger a CWS adjustment;

a generation unit, configured to generate at least one piece of control signaling for scheduling at least one uplink subframe in the second uplink burst, where each of the at least one piece of control signaling includes the contention window information or a clear channel assessment CCA backoff counter initial value generated based on the contention window information; and a sending unit, configured to send the at least one piece of control signaling to the UE.

The reference subframe includes at least one uplink subframe in at least one first uplink burst of the UE, the first uplink burst is before the second uplink burst, the second uplink burst and the first uplink burst are discontinuous in time, the first uplink burst includes at least one uplink subframe, and the second uplink burst includes at least one uplink subframe.

The apparatus is configured to perform the method for determining contention window information according to the first aspect or any possible implementation of the first aspect. For example, the apparatus may be a base station.

According to a fourth aspect, an apparatus for determining contention window information is provided. The apparatus is a user equipment, and the apparatus includes: a receiving unit, configured to receive at least one piece of control signaling sent by a base station for scheduling at least one uplink subframe in a second uplink burst, where each of the at least one piece of control signaling includes contention window information, a clear channel assessment CCA backoff counter initial value generated based on the contention window information, or a hybrid automatic repeat request HARQ indication, and the contention window information includes a contention window size CWS, a contention window time, or signaling instructing the UE to trigger a CWS adjustment;

a determining unit, configured to determine a CCA backoff counter initial value of the second uplink burst according to the at least one piece of control signaling; and a processing unit, configured to perform CCA for the second uplink burst according to the CCA backoff counter initial value of the second uplink burst.

The apparatus is configured to perform the method for determining contention window information according to the second aspect or any possible implementation of the second aspect. For example, the apparatus may be a user equipment.

According to a fifth aspect, an apparatus for determining contention window information is provided. The apparatus includes: a receiver, a transmitter, a memory, a processor, and a bus system. The receiver, the transmitter, the memory, and the processor are connected to each other by using the bus system. The memory is configured to store an instruction. The processor is configured to execute the instruction stored in the memory, to control the receiver to receive a signal, and to control the transmitter to send a signal. In addition, when the processor executes the instruction stored in the memory, the execution causes the processor to perform the method according to the first aspect or any possible implementation of the first aspect.

According to a sixth aspect, an apparatus for determining contention window information is provided. The apparatus includes: a receiver, a transmitter, a memory, a processor, and a bus system. The receiver, the transmitter, the memory, and the processor are connected to each other by using the bus system. The memory is configured to store an instruction. The processor is configured to execute the instruction stored in the memory, to control the receiver to receive a signal, and to control the transmitter to send a signal. In addition, when the processor executes the instruction stored in the memory, the execution causes the processor to perform the method according to the second aspect or any possible implementation of the second aspect.

According to a seventh aspect, a computer-readable medium is provided, configured to store a computer program. The computer program includes the instruction for performing the method according to the first aspect or any possible implementation of the first aspect.

According to an eighth aspect, a computer-readable medium is provided, configured to store a computer program. The computer program includes the instruction for performing the method according to the second aspect or any possible implementation of the second aspect.

Therefore, according to the method and apparatus for determining contention window information in this embodiment of the present disclosure, the base station can determine the contention window information of the second uplink burst of the UE by using the receiving state of the reference subframe, so that the UE can obtain appropriate contention window information, and fair channel access can be implemented through channel sensing based on random backoff.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 16(a) to FIG. 16(c) each are another schematic diagram of a reference subframe according to an embodiment of the present disclosure;

DESCRIPTION OF EMBODIMENTS

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
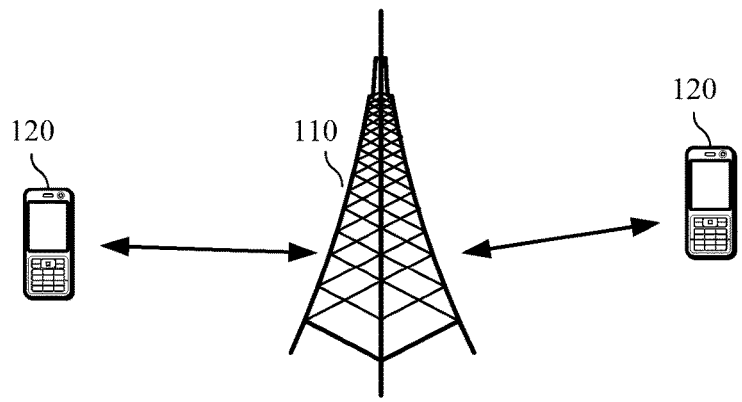
FIG. 1 is a schematic diagram of an application scenario according to an embodiment of the present disclosure.

FIG. 1 shows a communications system 100 applied in an embodiment of the present disclosure. The communications system 100 may include at least one network device 110. The network device 110 may be a device, such as a base station or a base station controller, communicating with a terminal device. Each network device 110 may provide communication coverage for a specified geographic area, and may communicate with a terminal device (for example, a UE) located in the coverage (cell). The network device 110 may be a base transceiver station (BTS) in a GSM system or a Code Division Multiple Access (CDMA) system, or a NodeB (NB) in a WCDMA system, or an evolved NodeB (eNB or eNodeB) in an LTE system, or a wireless controller in a cloud radio access network (CRAN), or the network device may be a relay station, an access node, an in-vehicle device, a wearable device, a network side device in a future 5G network, or a network device in a future evolved public land mobile network (PLMN), or the like.

In this embodiment of the present disclosure, the communications system 100 may be a cellular Internet-of-Things (CIoT) system. A CIoT system is an important machine type communication (MTC) communications system based on a basic architecture of an existing cellular network. Main service scopes of communication in a future Internet-of-Things may include intelligent meter reading, medical inspection and monitoring, logistics detection, industrial inspection and monitoring, automotive networking, intelligent community, wearable device communication, and the like. An Internet-of-Things industry about MTC communication construction is considered to be a fourth wave of the information industry in succession to computers, the Internet, and a mobile communications network and is a future development direction of networks. In addition, the CIoT system has requirements of large coverage, a large quantity of connections, low costs, and low power consumption on networks and terminal devices.

The communications system 100 further includes a plurality of terminal devices 120 located within coverage of the network device 110. The terminal device 120 may be movable or fixed. The terminal device 120 may refer to an access terminal, a user equipment (UE), a user unit, a user station, a mobile station, a mobile console, a remote station, a remote terminal, a mobile device, a user terminal, a terminal, a wireless communications device, a user agent, or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network PLMN, or the like.

FIG. 1 shows an example of one network device and two terminal devices. Optionally, the communications system 100 may include a plurality of network devices, and another quantity of terminal devices may be included within coverage of each network device. This is not limited in this embodiment of the present disclosure.

Optionally, the wireless communications system 100 may further include another network entity such as a network controller or a mobility management entity. This is not limited in this embodiment of the present disclosure.

It should be understood that an application scenario of this embodiment of the present disclosure may be in an LTE system in an unlicensed spectrum, for example, in an LAA-LTE system. Specifically, a sending node may aggregate a plurality of carriers by using a CA technology, for example, aggregate an unlicensed carrier and a licensed carrier, or aggregate unlicensed carriers.

More specifically, there are the following three carrier allocation scenarios.

1. A licensed spectrum and an unlicensed spectrum are deployed as co-located. To be specific, the licensed spectrum and the unlicensed spectrum are aggregated by a same sending node. The node sets a licensed carrier to a PCC, and sets an unlicensed carrier to an SCC.

2. A licensed spectrum and an unlicensed spectrum are deployed as non-co-located. For example, the licensed spectrum is deployed on a macro base station, and the unlicensed spectrum is deployed on a low power node. The low power node may include a micro cell, a pico cell, a femto eNodeB (Femto cell), a remote radio head, a relay, or the like. The macro base station and the low power node are connected to each other by using an ideal or a non-ideal backhaul link.

3. An unlicensed spectrum is independently deployed on a sending node. To be specific, the sending node uses only the unlicensed spectrum, and does not use any licensed spectrum.

It should be understood that network elements in this embodiment of the present disclosure mainly refer to a base station and UE that can work in the unlicensed spectrum. The base station may be a macro base station, a micro cell, a pico cell, a home eNodeB, a remote radio head, a relay, or the like. The UE may be a terminal device such as a mobile phone, or a notebook computer that can access the LTE system or a tablet computer that can access the LTE system. This is not limited in the present disclosure.

It should be understood that the embodiments of the present disclosure are described by using an LAA-LTE system as an example only, but the present disclosure is not limited thereto. The method and apparatus according to the embodiments of the present disclosure may also be applied to another communications system. Similarly, the embodiments of the present disclosure are described by using an evolved NodeB (e-NB or e-NodeB) in LTE and UE as an example only, but the present disclosure is not limited thereto.

Figure 2:
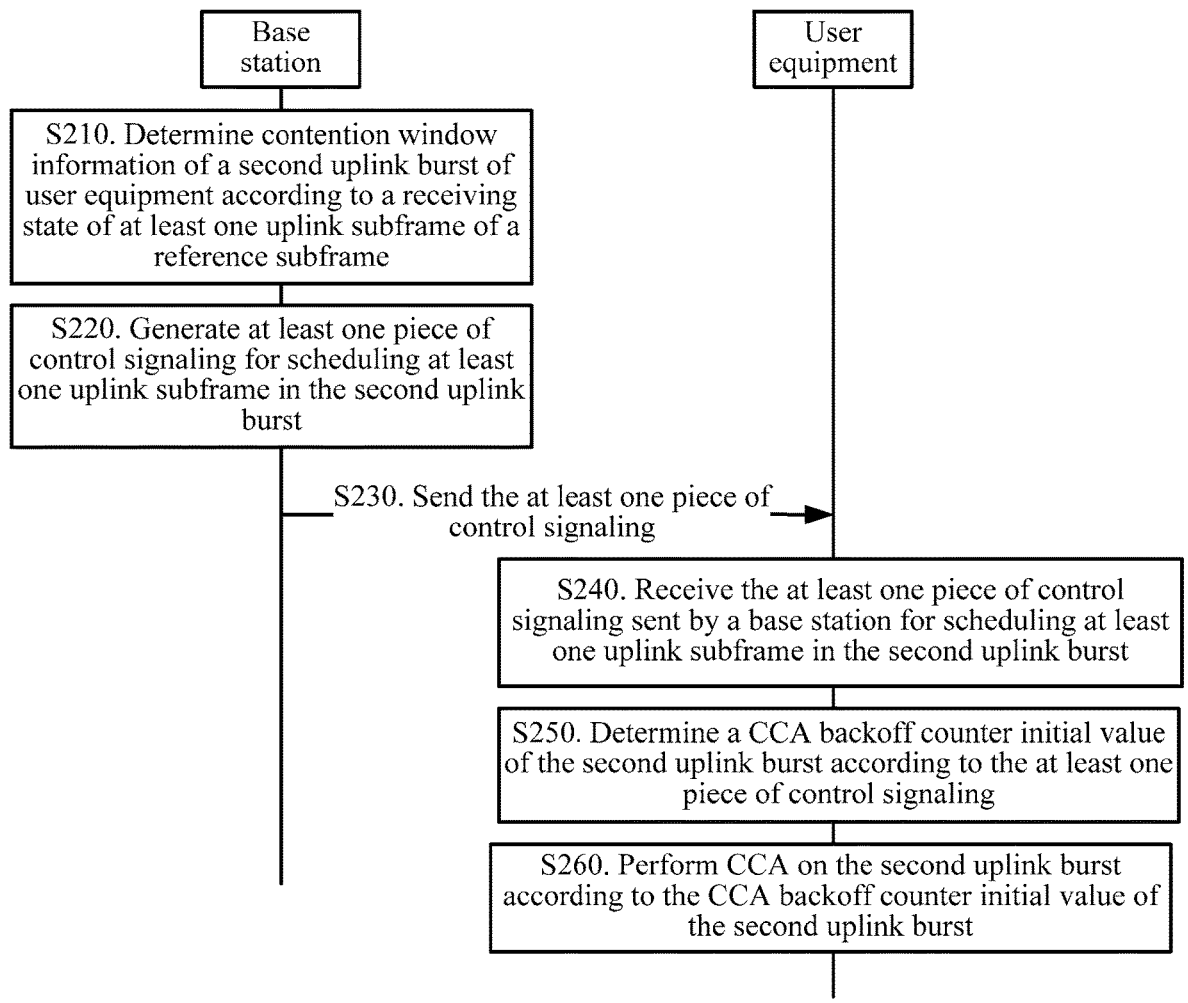
FIG. 2 is a schematic flowchart of a method for determining contention window information according to an embodiment of the present disclosure.

FIG. 2 is a schematic flowchart of a method for determining contention window information according to an embodiment of the present disclosure. As shown in FIG. 2, the method includes the following steps.

S210. A base station determines contention window information of a second uplink burst of UE according to a receiving state of a reference subframe, where the contention window information is a CWS, a contention window time, or signaling instructing the UE to trigger a CWS adjustment.

In S210, the base station may determine, by using a check code of the cyclic redundancy check (CRC) in the reference subframe, a receiving state of each uplink subframe in the reference subframe sent by the UE. If the check code is correct, the base station determines that the receiving is correct, that is, the receiving state is ACK (acknowledgement). If the check code is incorrect, the base station determines that the receiving is incorrect, that is, the receiving state is NACK (negative acknowledgement).

It should be understood that the reference subframe may be at least one uplink subframe in at least one first uplink burst of the UE, the first uplink burst is before the second uplink burst, the second uplink burst and the first uplink burst are discontinuous in time, the second uplink burst includes at least one uplink subframe, and the first uplink burst includes at least one uplink subframe. If the second uplink burst includes at least two uplink subframes, any two contiguous uplink subframes of the at least two uplink subframes may be continuous in time, or may be discontinuous in time. If the first uplink burst includes at least two uplink subframes, any two contiguous uplink subframes of the at least two uplink subframes may be continuous in time, or may be discontinuous in time.

It should be understood that when the at least two uplink subframes are continuous in time, the first uplink burst and an uplink subframe before or after the first uplink burst are continuous in time, that is, a subset of uplink subframes that are continuous in time in a set of uplink subframes that are continuous in time. Alternatively, the first uplink burst and uplink subframes before and after the first uplink burst may be discontinuous in time. To be specific, the first uplink burst and an uplink subframe after the first uplink burst are discontinuous in time, the second uplink burst and an uplink subframe before the second uplink burst are discontinuous in time, and the second uplink burst and an uplink subframe after the second uplink burst are discontinuous in time. The second uplink burst and an uplink subframe before or after the second uplink burst may be continuous in time, that is, a subset of uplink subframes that are continuous in time in a set of uplink subframes that are continuous in time. Alternatively, the second uplink burst and uplink subframes before and after the second uplink burst may be discontinuous in time. To be specific, the second uplink burst and an uplink subframe before the second uplink burst are discontinuous in time, and the second uplink burst and an uplink subframe after the second uplink burst are discontinuous in time.

It should be further understood that an uplink burst before the second uplink burst may be collectively referred to as a first uplink burst.

S220. The base station generates at least one piece of control signaling for scheduling at least one uplink subframe in the second uplink burst, where each of the at least one piece of control signaling includes the contention window information or a CCA backoff counter initial value generated based on the contention window information.

In S220, the contention window information may be a CWS, a contention window time, or signaling instructing the UE to trigger a CWS adjustment. The CWS is a maximum backoff value of CCA performed on the second uplink burst, that is, an upper limit of a CCA backoff counter initial value N. For example, when the CWS is 15, the CCA backoff counter initial value N is uniformly and randomly generated within [1, 15]. The contention window time is maximum backoff duration of CCA performed on the second uplink burst, that is, a result obtained by multiplying the CWS by a time granularity of each CCA timeslot. For example, when the CWS is 15, and the time granularity of a CCA timeslot is 9 us, duration of the contention window time is 15*9 us=135 us. The signaling instructing the UE to trigger an adjustment of the CWS, for example, 1-bit signaling, instructs the UE to trigger a increase/decrease of the CWS, or 2-bit signaling instructs the UE to trigger a increase/decrease/remaining unchanged of the CWS.

It should be understood that in S220, the CCA backoff counter initial value may be generated by using the CWS or the contention window time. Specifically, if a backoff counter initial value is generated by using the CWS, the value is uniformly and randomly generated within [1, CWS]. If a backoff counter initial value is generated by using the contention window time, the contention window time is divided by 9 us and converted to a CWS, and then the value is uniformly and randomly generated within [1, CWS].

Optionally, the control signaling may be for one subframe of the second uplink burst.

Optionally, the control signaling may be for at least two uplink subframes of the second uplink burst.

Specifically, if the control signaling is for one subframe of the second uplink burst, the control signaling carried in one downlink subframe schedules the UE to send uplink information in one uplink subframe. If the control signaling schedules at least two subframes of the second uplink burst, that is, a plurality of subframes, the control signaling carried in one downlink subframe schedules the UE to send uplink information in each of the at least two subframes.

S230. The base station sends the at least one piece of control signaling to the UE.

In S230, the base station sends the at least one piece of control signaling to the UE. The control signaling may be sent to a first uplink subframe in the second uplink burst of the UE, or sent to each uplink subframe in the second uplink burst of the UE.

It should be understood that the control signaling may be included in user-specific search space of a physical downlink control channel (PDCCH) or an enhanced physical downlink control channel (EPDCCH), and further, may be included in uplink grant of the PDCCH.

S240. The UE receives the at least one piece of control signaling, sent by the base station according to the reference subframe, for scheduling at least one uplink subframe in the second uplink burst, where the control signaling includes the contention window information or the CCA backoff counter initial value generated based on the contention window information.

S250. The UE determines a CCA backoff counter initial value of the second uplink burst according to the at least one piece of control signaling.

In S250, the UE receives the contention window information sent by the base station and generates the CCA backoff counter initial value, or the UE receives the CCA backoff counter initial value that is generated based on the contention window information and that is sent by the base station.

Specifically, when the contention window information received by the UE and sent by the base station is a CWS, the UE may uniformly and randomly generate a CCA backoff counter initial value between 0 and the CWS. When the contention window information received by the UE and sent by the base station is a contention window time, the UE may divide the contention window time by a CCA timeslot granularity, convert a result to a CWS, and uniformly and randomly generate a CCA backoff counter initial value between 0 and the CWS. When the UE receives signaling from the base station for instructing the UE to trigger an adjustment of the CWS, and the signaling received by the UE instructs to increase the CWS, the UE increases a CWS closest to and before a moment at which the contention window information is received. For example, the UE doubles the CWS as a new CWS. If the control signaling received by the UE instructs to decrease the CWS, the UE decreases a CWS closest to and before a moment at which the contention window information is received. For example, the CWS is increased to a minimum value, as a new CWS. When the signaling received by the UE instructs to maintain the CWS unchanged, the UE uses a CWS closet to and before a moment at which the contention window information is received as a new CWS. Finally, the UE uniformly and randomly generates a CCA backoff counter initial value between 0 and the new CWS. When the UE receives the CCA backoff counter initial value sent by the base station, the UE directly assigns the received CCA backoff counter initial value to a backoff counter.

It should be understood that the UE may determine a backoff counter initial counter of a first uplink subframe of the second uplink burst according to obtained contention window information that is included in control signaling of an uplink subframe in the second uplink burst and that is from the base station or a CCA backoff counter initial value generated based on contention window information.

Optionally, the UE determines the CCA backoff counter initial value of the second uplink burst of the UE according to contention window information included in control signaling sent by the base station for scheduling a first uplink subframe in the second uplink burst or a CCA backoff counter initial value generated based on the contention window information.

It should be understood that the first uplink subframe is a first uplink subframe sent by the UE and scheduled by the base station or a first uplink subframe actually sent by a user.

Optionally, the UE determines the CCA backoff counter initial value of the second uplink burst according to contention window information in control signaling closest to the second uplink burst or a CCA backoff counter initial value generated based on the contention window information.

The following specifically describes a method for determining the CWS in the contention window information by the base station or the UE.

Figure 3:
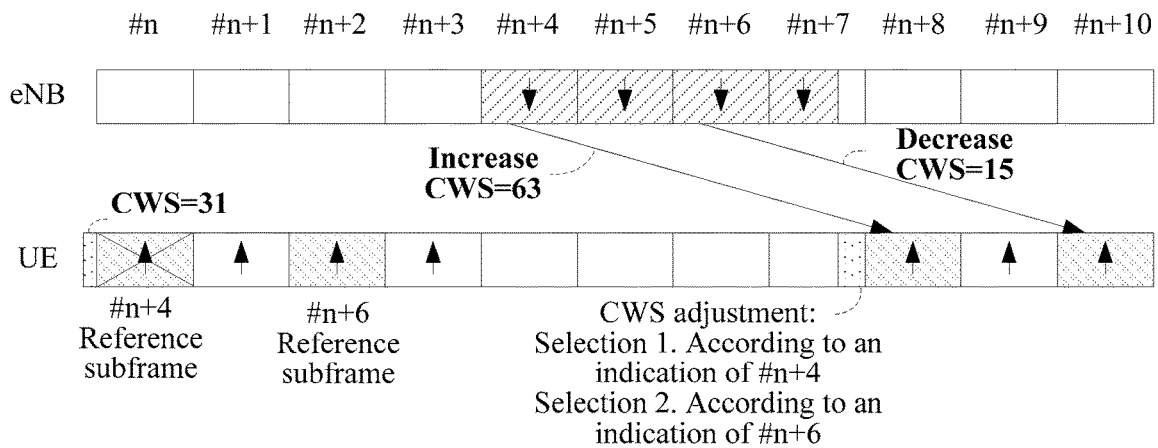
FIG. 3 is another schematic diagram of a method for determining a contention window information according to an embodiment of the present disclosure.

Specifically, this may be shown in FIG. 3. Considering that a scheduling delay of the base station is approximately 4 ms, before sensing the first uplink subframe of the second uplink burst, the UE not only receives the control signaling for the first uplink subframe, but also may receive control signaling for a subsequent uplink subframe or for a subsequent uplink burst. In this case, as shown in FIG. 3, the UE may use contention window information included in control signaling of a scheduled uplink burst or a CCA backoff counter initial value generated based on the contention window information. The contention window information may be, for example, a CWS. Further, the UE may use contention window information included in control signaling of a first uplink subframe of a scheduled uplink burst or a CCA backoff counter initial value generated based on the contention window information. The contention window information may be, for example, a CWS. Alternatively, the UE may use contention window information included in received control signaling (that is, the control signaling for a subsequent uplink burst) closest to the scheduled second uplink burst or a CCA backoff counter initial value generated based on the contention window information. The contention window information may be, for example, a CWS.

S260. Perform CCA for the second uplink burst according to the CCA backoff counter initial value of the second uplink burst.

In S260, the UE may perform CCA only for the first uplink subframe of the second uplink burst. For continuous uplink subframes in a subsequent time domain of the uplink burst, even if received control signaling for these subsequent uplink subframes indicates contention window information, the UE does not additionally perform CCA any longer but directly sends uplink information.

Optionally, when the UE does not receive, from the base station, the control signaling for the first uplink subframe of the second uplink burst, or does not complete the CCA before the first uplink subframe of the second uplink burst, an uplink subframe in which the UE starts to send data is defined as the first uplink subframe of the second uplink burst.

It should be understood that the UE may perform the CCA before the first uplink subframe of the second uplink burst. The first uplink subframe of the second uplink burst herein is a first uplink subframe of at least one uplink subframe actually sent by the UE, but not a first uplink subframe of at least one uplink subframe scheduled by the base station. In other words, the UE does not send uplink information in a first uplink subframe indicated by control signaling from the base station. To be specific, the UE does not correctly receive from the base station, the control signaling for the first uplink subframe of the second uplink burst, or does not complete the CCA before the first uplink subframe of the second uplink burst indicated by the control signaling from the base station, but starts to perform sending in a subsequent subframe. In this case, the uplink subframe in which the UE starts to send data is the first uplink subframe of the second uplink burst.

Figure 4A:
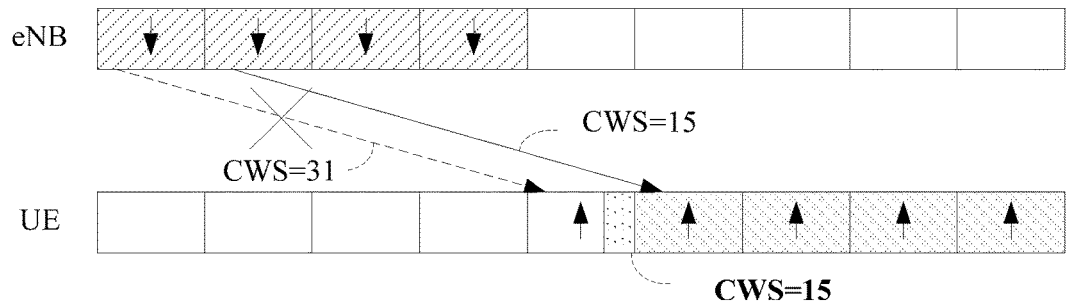
FIG. 4(a) and FIG. 4(b) each are another schematic diagram of a method for determining a contention window size according to an embodiment of the present disclosure.

Specifically, as shown in FIG. 4(a), if the UE does not receive control signaling corresponding to a first uplink subframe of uplink subframes that are continuous in time domain and that are indicated by the control signaling from the base station, but receives control signaling corresponding to a subsequent subframe of the uplink subframes that are continuous in time domain and that are indicated by the control signaling from the base station, and if the UE receives contention window information included in the control signaling for the subsequent subframe, a CWS used by the UE to perform the CCA is determined according to the contention window information.

Figure 4B:
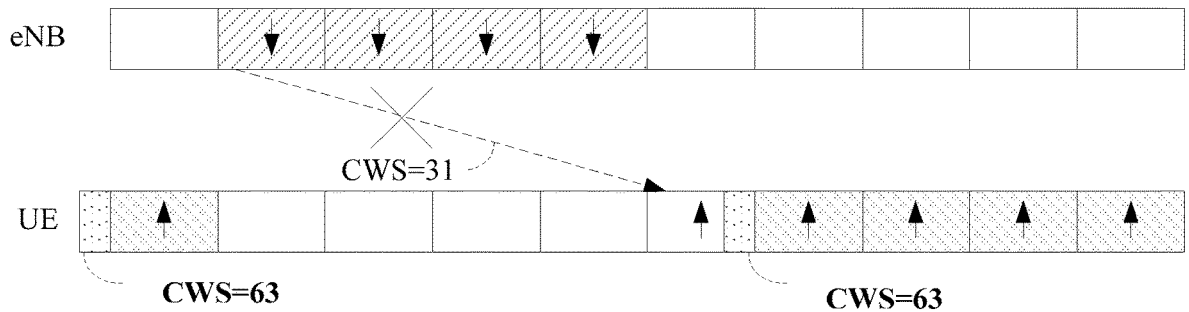

For example, as shown in FIG. 4(b), if the UE does not receive the contention window information (that is, the base station does not indicate contention window information in control signaling for each uplink subframe, but adds contention window information only to control signaling corresponding to a first uplink subframe of uplink subframes that are continuously scheduled by the base station in time domain) included in control signaling for the subsequent subframe, the UE generates a CCA backoff counter initial value by using a CWS used in CCA that is previously and most recently performed.

Optionally, when the UE receives the control signaling sent by the base station for scheduling the first uplink subframe of the second uplink burst, but does not capture any channel before the first uplink subframe indicated by the control signaling, and the UE receives control signaling sent by the base station for scheduling a subsequent uplink subframe of the second uplink burst, the UE uses contention window information of an uplink subframe after the first uplink subframe indicated by the control signaling or a CCA backoff counter initial value generated based on the contention window information, to determine a CCA backoff counter initial value, and restarts CCA.

Optionally, when the UE receives the control signaling sent by the base station for scheduling the first uplink subframe of the second uplink burst, and does not capture any channel before the first uplink subframe indicated by the control signaling, in other words, does not complete CCA backoff, the UE continues to perform the CCA for the subsequent uplink subframe of the second uplink burst that is scheduled by the base station.

Moreover, when the UE receives, from the base station, UL grant for scheduling the first uplink subframe of the second uplink burst, and does not capture any channel before the first uplink subframe indicated by the UL grant, the UE still needs to perform the CCA before sending a subsequent subframe that is of continuous uplink subframes in time domain and that is indicated by UL grant from the base station. Specifically, the UE may use contention window information or a CCA backoff counter initial value that is included in the UL grant and that is for the subsequent subframe, to determine a CCA backoff counter initial value, and restart CCA. Alternatively, the UE may continue CCA backoff for a previous uplink subframe.

Specifically, in this embodiment of the present disclosure, the base station may first determine the reference subframe, then determine, according to the receiving state of the reference subframe, how to adjust the contention window information of the UE, and finally send, to the UE by using downlink control signaling, the contention window information or a random CCA backoff counter initial value that is generated on a side of the base station. For example, the contention window information or the random CCA backoff counter initial value that is generated on the side of the base station is sent to the UE by using UL grant of a PDCCH. The UE may determine the CCA backoff counter initial value of the second uplink burst according to information in the control signaling, and then the UE may perform the CCA for the second uplink burst according to the CCA backoff counter initial value.

It should be understood that an uplink subframe in the first uplink burst may be an uplink subframe sent by the UE and scheduled by the base station, the first uplink burst is before the second uplink burst, and base station may determine, by using a receiving state of the uplink subframe in the first uplink burst, a CWS used by the UE to sense a channel before the second uplink burst.

Therefore, according to the method for determining contention window information in this embodiment of the present disclosure, the base station can determine the contention window information of the second uplink burst of the UE by using the receiving state of the reference subframe, so that the UE can obtain appropriate contention window information, and fair channel access can be implemented through channel sensing based on random backoff.

Before the contention window information of the second uplink burst or the clear channel assessment CCA backoff counter initial value generated based on the contention window information is determined, contention window information of a third uplink burst of the UE or a clear channel assessment CCA backoff counter initial value generated based on the contention window information is determined according to the reference subframe.

Optionally, the method for determining contention window information by the base station in this embodiment of the present disclosure further includes:

determining a CWS of the third uplink burst of the UE according to the reference subframe before the CWS of the second uplink burst is determined; and determining that the CWS of the second uplink burst is equal to the CWS of the third uplink burst.

The first uplink burst, the second uplink burst, and the third uplink burst are discontinuous in time, the third uplink burst is between the first uplink burst and the second uplink burst, and the third uplink burst includes one uplink subframe or at least two uplink subframes that are continuous in time. If the third uplink burst includes at least two uplink subframes, any two contiguous uplink subframes of the at least two uplink subframes may be continuous in time, or may be discontinuous in time.

It should be understood that when two different uplink bursts, for example, the second uplink burst and the third uplink burst, correspond to a same reference subframe, the base station should avoid additionally increasing or decreasing the CWS when scheduling the two uplink bursts.

Figure 5:
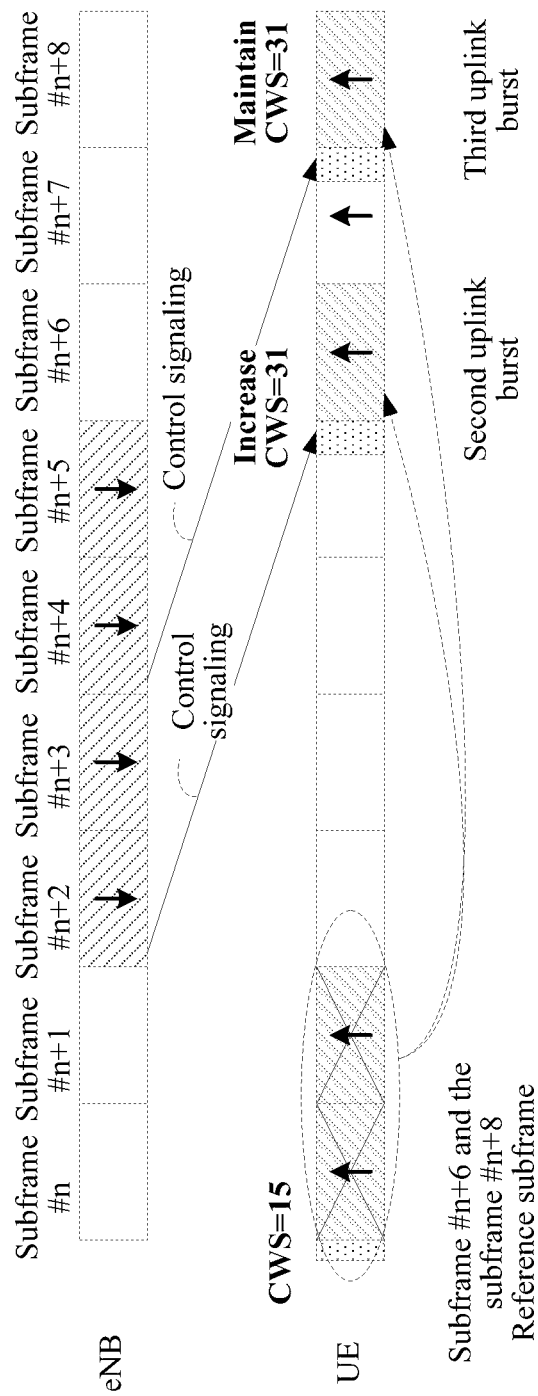
FIG. 5 is another schematic diagram of a method for determining a contention window size according to an embodiment of the present disclosure.

For example, as shown in FIG. 5, the reference subframe is a first uplink burst {#n, #n+1}, the third uplink burst is a subframe #n+6, the second uplink burst is a subframe #n+8, both the second uplink burst and the third uplink burst correspond to the reference subframe {#n+1}, and the reference subframe is incorrectly transmitted. The base station may instruct to increase a CWS of #n+6 to 31 when scheduling #n+6. Because reference subframes of the subframe #n+6 and the subframe #n+8 are the same, a CWS that is the same as that of #n+6, that is, 31, should be used for the subframe #n+8, and the CWS of #n+6 is not increased to 63.

The method for determining contention window information in this embodiment of the present disclosure is described above. The following specifically describes how to determine the contention window information of the second uplink burst of the UE according to the receiving state of the reference subframe.

Optionally, in this embodiment of the present disclosure, the method for determining the contention window information for the transmission of the second uplink burst of the UE, for example, a method for determining the CWS of the second uplink burst of the UE, includes:

when a receiving state of at least one uplink subframe in the reference subframe is NACK, increasing the CWS.

It should be understood that before the base station determines the CWS of the second uplink burst of the UE, when the receiving state of the at least one uplink subframe in the reference subframe is NACK, and the base station has continuously generated a backoff counter initial value according to a preset maximum value of the CWS at least once, the CWS remains unchanged, or the CWS is set to a preset minimum value.

When a receiving state of each uplink subframe in the reference subframe is ACK, the CWS is to be decreased.

It should be further understood that before the base station determines the CWS for the second uplink burst of the UE, when the receiving state of each uplink subframe in the reference subframe is ACK, and the CWS has reached the preset minimum value, the CWS remains unchanged.

Further, when the receiving state of the at least one uplink subframe in the reference subframe is NACK, and each of the at least one uplink subframe is an uplink subframe that is detected by the base station and that is not sent by the UE, the CWS remains unchanged, or the at least one reference subframe is omitted and is not used for adjusting the CWS.

It should be understood that when the base station has a capability of detecting and determining whether the UE sends an uplink subframe, the base station may omit a reference subframe in which the UE does not occupy an uplink subframe to send information, and not use the reference subframe to adjust the CWS. For example, the base station uses a demodulation reference signal (DM-RS). If detecting that the DM-RS exists, the base station determines that the UE sends an uplink subframe. If the DM-RS is not detected, the base station may determine that the UE does not send an uplink subframe, and may omit the subframe. Therefore, if a receiving state of at least one reference subframe is NACK and each uplink subframe in the at least one reference subframe is an uplink subframe that is detected by the base station and that is not sent by the UE, the CWS remains unchanged, or is omitted and not used as a basis for adjusting the CWS.

For example, when a value set of the CWS is {15, 31, 63}, and the first uplink burst and the second uplink burst of the UE each include two uplink subframes that are continuous in time domain, the two uplink subframes of the first uplink burst may be used as reference subframes of the second uplink burst, and the two uplink subframes of the second uplink burst may be used as reference subframes of the third uplink burst.

Figure 6A:
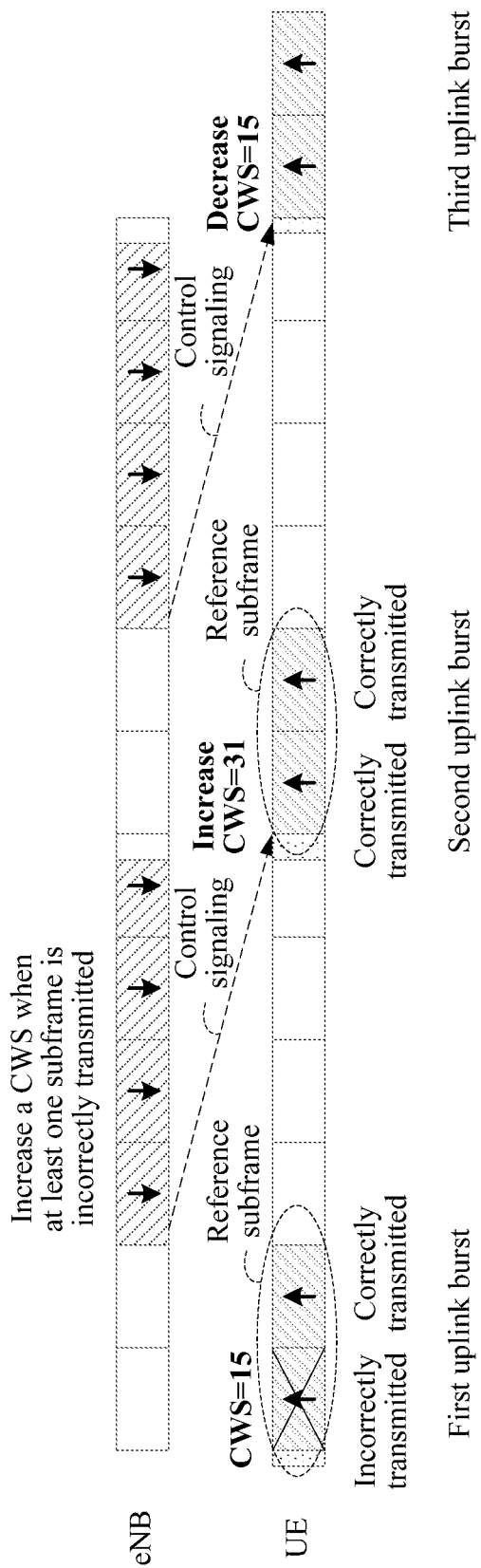
FIG. 6(a) to FIG. 6(c) each are another schematic diagram of a method for determining a contention window size according to an embodiment of the present disclosure.

As shown in FIG. 6(a), when the receiving state of the at least one uplink subframe in the reference subframe is NACK, the CWS is to be increased. When the receiving state of each uplink subframe in the reference subframe is ACK, the CWS is to be decreased. Because a receiving state of one uplink subframe in the first uplink burst is NACK, the base station determines that the CWS of the second uplink burst of the UE needs to be increased from 15 to 31. In addition, because a receiving state of each uplink subframe in the second uplink burst is ACK, the base station determines that the CWS of the third uplink burst of the UE needs to be decreased from 31 to 15.

Figure 6B:
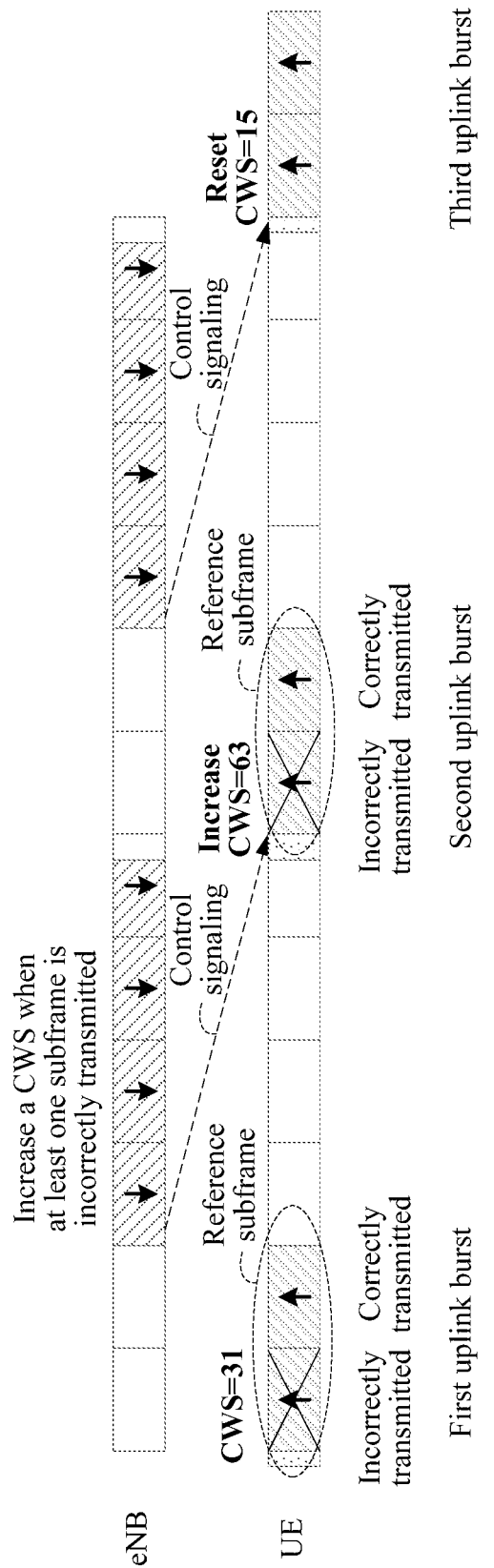

As shown in FIG. 6(b), a receiving state of one uplink subframe in the second uplink burst is NACK, and at this time, the CWS has reached the maximum value. Assuming that the maximum value of the CWS is used to generate a CCA backoff counter initial value once, if it is determined that the CWS still needs to be increased, the CWS is reset to the minimum value. In other words, the CWS of the third uplink burst of the UE may be reset to the minimum value 15.

Figure 6C:
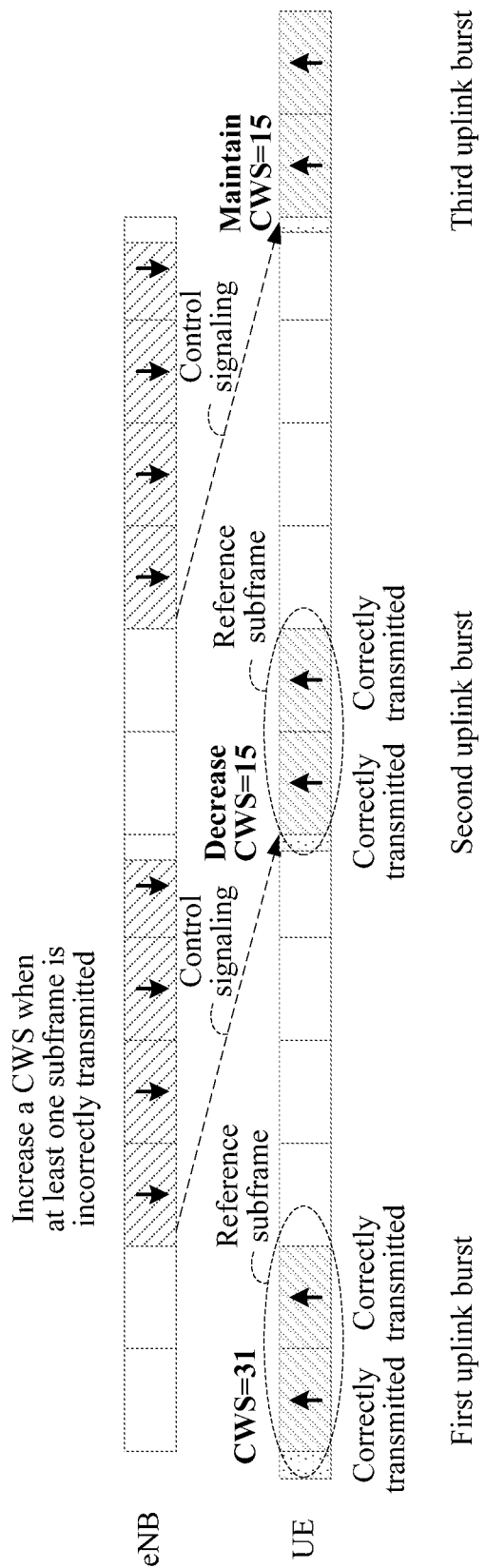

As shown in FIG. 6(c), because receiving states of the two uplink subframes in the first uplink burst are both ACK, the base station may decrease the CWS transmitted in the second uplink burst of the UE to the minimum value 15. In addition, because receiving states of the two uplink subframes in the second uplink burst are both ACK, the base station may maintain the CWS transmitted in the third uplink burst of the UE to be the minimum value 15.

It should be understood that a condition for determining to increase the CWS is: a receiving state of the at least one uplink subframe in the reference subframe is NACK. Different from the foregoing condition for determining to increase the CWS, the following condition for determining to increase the CWS is: when receiving states of all the uplink subframes in the reference subframe are NACK, the CWS is to be increased.

Optionally, in this embodiment of the present disclosure, the method for determining the contention window information of the second uplink burst of the UE, for example, a method for determining the CWS of the second uplink burst of the UE, further includes:

when a receiving state of each uplink subframe in the reference subframe is NACK, increasing the CWS.

It should be understood that before the base station determines the CWS of the second uplink burst of the UE, when the receiving state of each uplink subframe in the reference subframe is NACK, and the base station has continuously generated a CCA backoff counter initial value according to a preset maximum value of the CWS at least once, the CWS remains unchanged, or the CWS is set to a preset minimum value.

When a receiving state of at least one uplink subframe in the reference subframe is ACK, the CWS is to be decreased.

It should be understood that before the base station determines the CWS of the second uplink burst of the UE, when the receiving state of the at least one uplink subframe in the reference subframe is ACK, and the CWS has reached the preset minimum value, the CWS remains unchanged.

Further, when the receiving state of each uplink subframe in the reference subframe is NACK, and each of the at least one uplink subframe is an uplink subframe that is detected by the base station and that is not sent by the UE, the CWS remains unchanged, or the at least one reference subframe is omitted and is not used for adjusting the CWS.

It should be understood that if the base station may detect that none of the uplink subframes in the reference subframe is occupied by the UE to send uplink information, the base station may omit each reference subframe, and not use the reference subframe to adjust the CWS.

Optionally, in this embodiment of the present disclosure, the method for determining the contention window information transmitted in the second uplink burst of the UE, for example, a method for determining the contention window time of the second uplink burst of the UE, includes:

when a receiving state of at least one uplink subframe in the reference subframe is NACK, increasing the contention window time; or when a receiving state of each uplink subframe in the reference subframe is ACK, decreasing the contention window time.

Further, when the receiving state of the at least one uplink subframe in the reference subframe is NACK, and each of the at least one uplink subframe is an uplink subframe that is detected by the base station and that is not sent by the UE, the contention window time remains unchanged, or the at least one reference subframe is omitted and is not used for adjusting the contention window time.

Optionally, the method for determining the contention window time of the second uplink burst of the UE further includes:

when a receiving state of each uplink subframe in the reference subframe is NACK, increasing the contention window time; or when a receiving state of at least one uplink subframe in the reference subframe is ACK, decreasing the contention window time.

Further, when the receiving state of the at least one uplink subframe in the reference subframe is NACK, and each of the at least one uplink subframe is an uplink subframe that is detected by the base station and that is not sent by the UE, the contention window time remains unchanged, or the at least one reference subframe is omitted and is not used for adjusting the contention window time.

Optionally, in this embodiment of the present disclosure, the method for determining the contention window information for transmission of the second uplink burst of the UE, for example, a method for determining signaling that is used by the UE to trigger an adjustment of the CWS of the second uplink burst of the UE, includes:

when a receiving state of at least one uplink subframe in the reference subframe is NACK, determining to trigger an indication for increasing the CWS; or when a receiving state of each uplink subframe in the reference subframe is ACK, determining trigger an indication for decreasing the CWS.

Further, when the receiving state of the at least one uplink subframe in the reference subframe is NACK, and each of the at least one uplink subframe is an uplink subframe that is detected by the base station and that is not sent by the UE, it is determined to trigger the CWS to remain unchanged, or the at least one reference subframe is omitted and is not used for the signaling for triggering adjustment of the CWS.

Optionally, the method for determining signaling that is used by the UE to trigger a CWS adjustment and that is of the second uplink burst of the UE further includes:

when a receiving state of each uplink subframe in the reference subframe is NACK, determining trigger an indication for increasing the CWS; or when a receiving state of at least one uplink subframe in the reference subframe is ACK, determining trigger an indication for decreasing the CWS.

Further, when the receiving state of each uplink subframe in the reference subframe is NACK, and each of the at least one uplink subframe is an uplink subframe that is detected by the base station and that is not sent by the UE, it is determined to trigger the CWS to remain unchanged, or the at least one reference subframe is omitted and is not used for the signaling for triggering the adjustment of the CWS.

It should be understood that a principle of determining, by the base station, the contention window time and the signaling instructing the UE to trigger the adjustment of the CWS is similar to a principle of determining the CWS. Details are not described herein again.

Optionally, in this embodiment of the present disclosure, the method for determining the contention window information transmitted in the second uplink burst of the UE, for example, a method for determining the CWS of the second uplink burst of the UE, further includes:

in the reference subframe, when a quantity of uplink subframes whose receiving states are NACK is greater than a first preset threshold, or when a percentage of uplink subframes whose receiving states are NACK in all uplink subframes is greater than a second preset threshold, increasing the CWS.

It should be understood that before the base station determines the CWS for the second uplink burst of the UE, when the quantity of uplink subframes whose receiving states are NACK in the reference subframe is greater than or equal to the first preset threshold, or the percentage of the uplink subframes whose receiving states are NACK in the reference subframe in all the uplink subframes in the reference subframe is greater than or equal to the second preset threshold, and the base station has continuously generated a CCA backoff counter initial value according to a preset maximum value of the CWS at least once, the CWS remains unchanged, or the CWS is set to a preset minimum value.

When the quantity of uplink subframes whose receiving states are NACK is less than the first preset threshold, or when the percentage of the uplink subframes whose receiving states are NACK in all the uplink subframes is less than the second preset threshold, the CWS is to be decreased.

Optionally, when the quantity of uplink subframes whose receiving states are NACK is equal to the first preset threshold, or when the percentage of the uplink subframes whose receiving states are NACK in all the uplink subframes is equal to the second preset threshold, the CWS is to be increased or decreased.

It should be understood that before the base station determines the CWS for the second uplink burst of the UE, when the quantity of uplink subframes whose receiving states are NACK in the reference subframe is less than or equal to the first preset threshold, or the percentage of the uplink subframes whose receiving states are NACK in the reference subframe in all the uplink subframes in the reference subframe is less than or equal to the second preset threshold, and the CWS has reached the preset minimum value, the CWS remains unchanged.

It should be understood that the first preset threshold and/or the second preset threshold may be predefined in a protocol. In this way, the adjustment of the CWS may be determined based on a value relationship with a predefined first preset threshold or second preset threshold without needing a complex calculation process, so that calculation costs are reduced, and efficiency can be improved.

Further, in the reference subframe, if at least one reference subframe is an uplink subframe that is detected by the base station and that is not sent by the UE, the at least one reference subframe is omitted and is not used for adjusting the CWS.

It should be understood that, that the at least one reference subframe is omitted includes: the quantity of uplink subframes whose receiving states are NACK does not include the at least one reference subframe, and all the uplink subframes do not include the at least one reference subframe.

For example, when a value set of the CWS is {15, 31, 63}, and the first uplink burst and the second uplink burst of the UE each include two uplink subframes that are continuous in time domain, it is assumed that the two uplink subframes of the first uplink burst are reference subframes of the second uplink burst, and the two uplink subframes of the second uplink burst are reference subframes of the third uplink burst. Assuming that the second preset threshold is 80%, when receiving states of at least 80% of uplink subframes in the reference subframe are NACK, it is determined that the CWS needs to be increased; otherwise, the CWS is to be decreased.

Figure 7A:
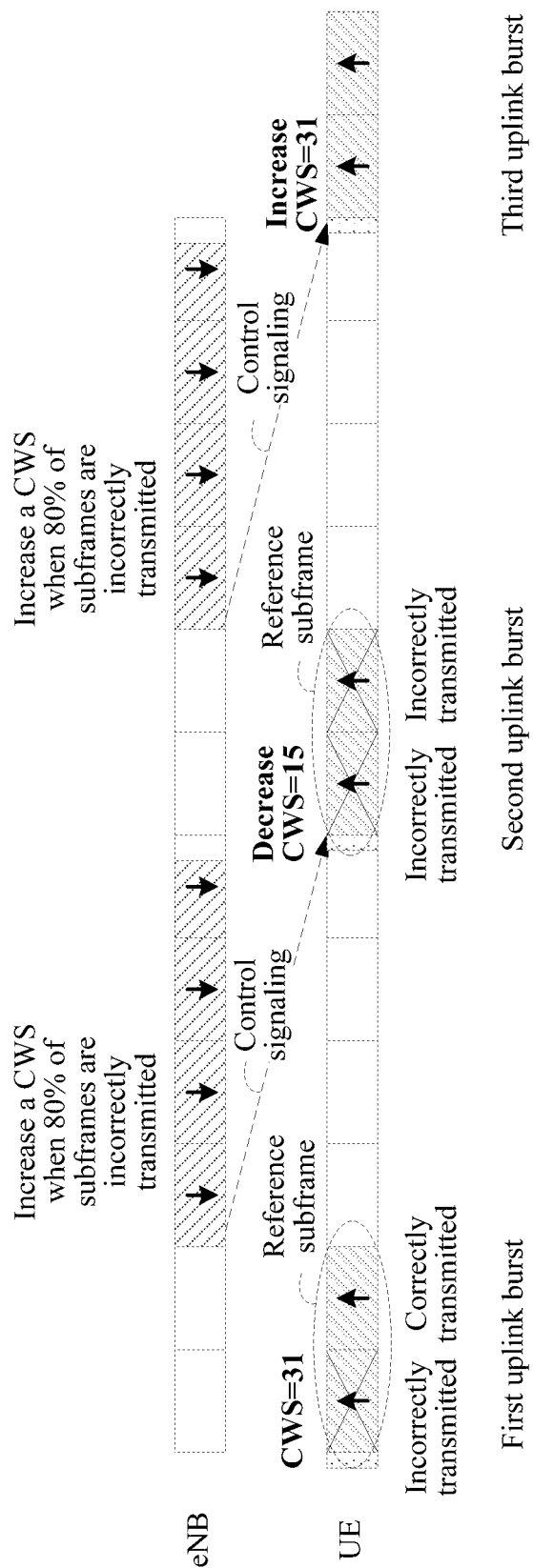
FIG. 7(a) to FIG. 7(c) each are another schematic diagram of a method for determining a contention window size according to an embodiment of the present disclosure.

As shown in FIG. 7(a), when receiving states of 50% of uplink subframes in the first uplink burst are NACK, in other words, the percentage is less than the second preset threshold, that is, 80%, the base station may decrease the CWS of the second uplink burst of the UE from 31 to the minimum value 15. When receiving states of 100% of uplink subframes in the second uplink burst are NACK, in other words, the percentage is greater than the second preset threshold 80%, the base station may increase the CWS of the third uplink burst of the UE from 15 to 31.

Figure 7B:
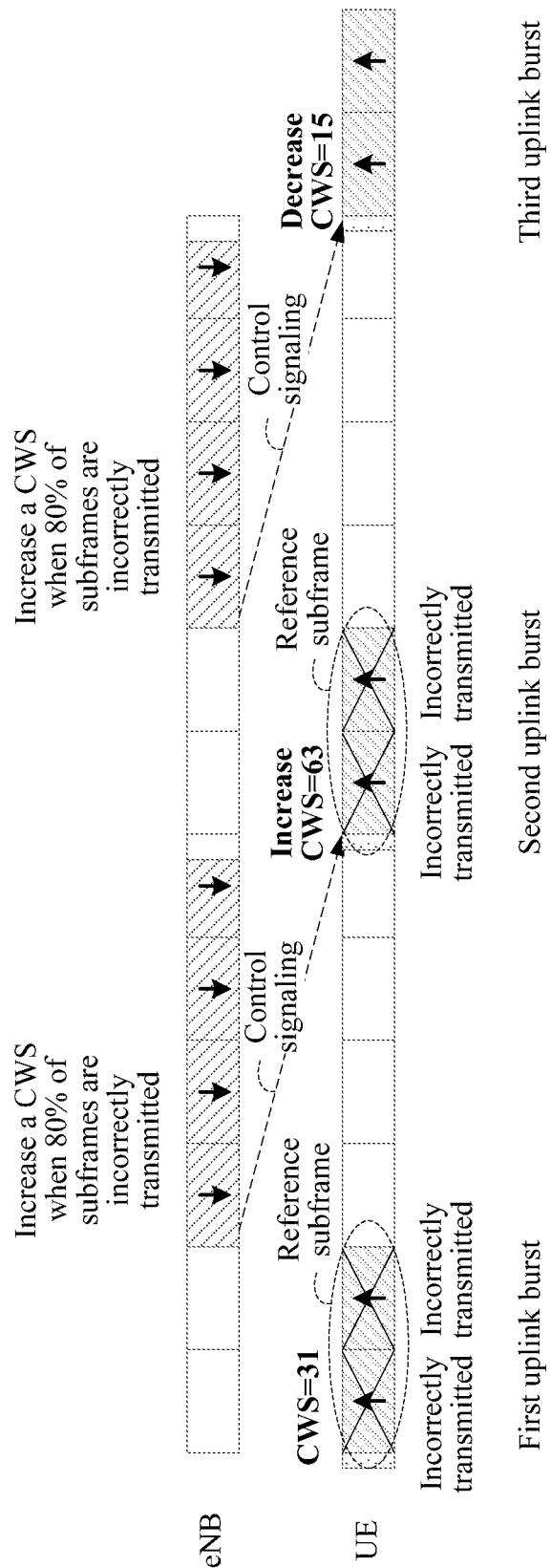

As shown in FIG. 7(b), when receiving states of 100% of uplink subframes in the second uplink burst are NACK, in other words, the percentage is greater than the second preset threshold 80%, the CWS has reached the maximum value. Assuming that the maximum value of the CWS is used to generate a CCA backoff counter initial value once, if it is determined that the CWS still needs to be increased, the CWS is reset to a minimum value. In other words, the CWS transmitted in the third uplink burst of the UE is reset to the minimum value 15.

Figure 7C:
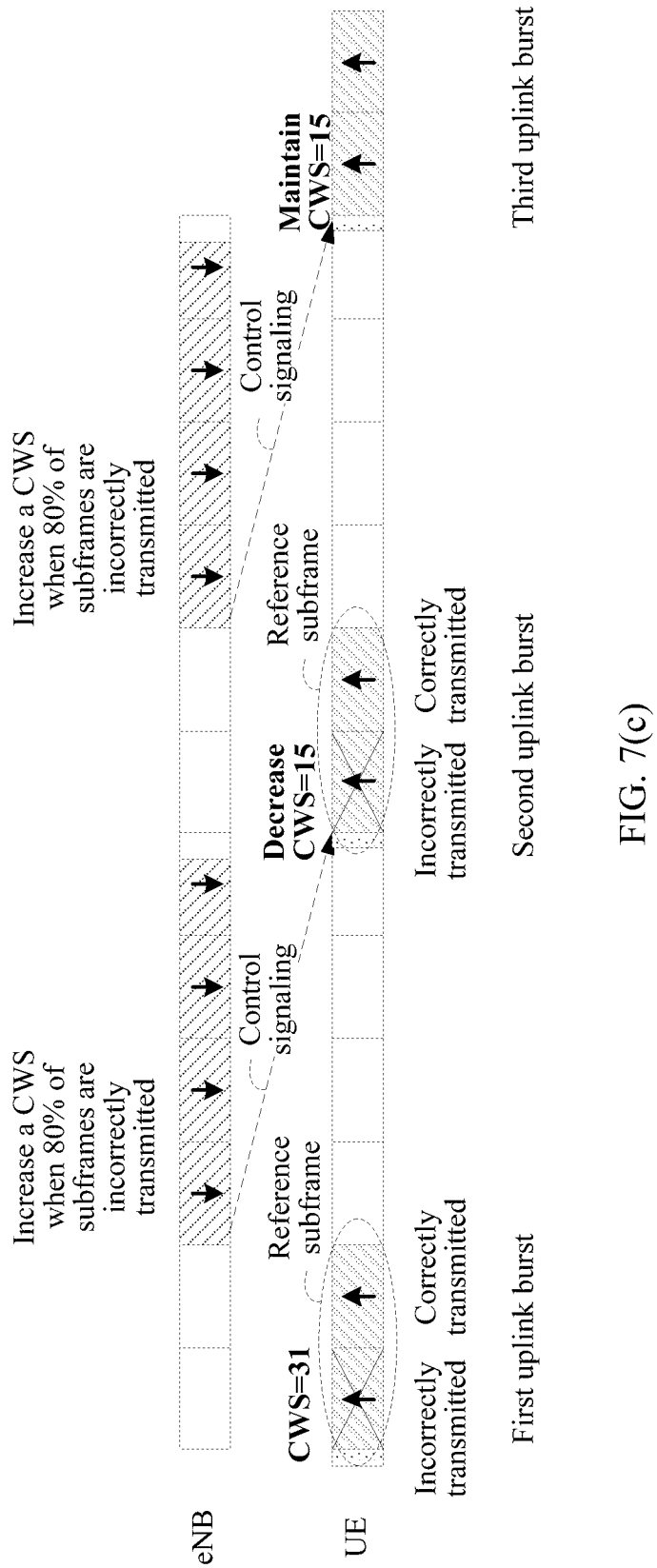

As shown in FIG. 7(c), when receiving states of 50% of uplink subframes in the second uplink burst are NACK, in other words, the quantity is less than the second preset threshold 80%, and the CWS has reached the minimum value, the base station may maintain the CWS transmitted in the third uplink burst of the UE to be the minimum value 15.

Optionally, in this embodiment of the present disclosure, the method for determining the contention window information transmitted in the second uplink burst of the UE, for example, a method for determining the contention window time of the second uplink burst of the UE, further includes:

in the reference subframe, when the quantity of uplink subframes whose receiving states are NACK is greater than the first preset threshold, increasing the contention window time; when the quantity of uplink subframes whose receiving states are NACK is less than the first preset threshold, decreasing the contention window time; or when the quantity of uplink subframes whose receiving states are NACK is equal to the first preset threshold, increasing or decreasing the contention window time;

when the percentage of uplink subframes whose receiving states are NACK in all the uplink subframes is greater than the second preset threshold, increasing the contention window time; or when the percentage of uplink subframes whose receiving states are NACK in all the uplink subframes is less than the second preset threshold, decreasing the contention window time; or when the percentage of uplink subframes whose receiving states are NACK in all the uplink subframes is equal to the second preset threshold, increasing or decreasing the contention window time.

Further, in the reference subframe, if at least one reference subframe is an uplink subframe that is detected by the base station and that is not sent by the UE, the at least one reference subframe is omitted and is not used for adjusting the contention window time.

Optionally, in this embodiment of the present disclosure, the method for determining the contention window information transmitted in the second uplink burst of the UE, for example, the method for determining signaling that is used by the UE to trigger a CWS adjustment and that is of the second uplink burst of the UE, further includes:

in the reference subframe, when the quantity of uplink subframes whose receiving states are NACK is greater than the first preset threshold, or when the percentage of the uplink subframes whose receiving states are NACK in all the uplink subframes is greater than the second preset threshold, determining trigger an indication for increasing the CWS; or when the quantity of uplink subframes whose receiving states are NACK is less than the first preset threshold, or when the percentage of the uplink subframes whose receiving states are NACK in all the uplink subframes is less than the second preset threshold, determining trigger an indication for decreasing the CWS.

Optionally, when the quantity of uplink subframe whose receiving states are NACK is equal to the first preset threshold, or when the percentage of the uplink subframes whose receiving states are NACK in all the uplink subframes is equal to the second preset threshold, an indication for increasing the CWS or an indication for decreasing the CWS is determined.

Further, in the reference subframe, if at least one reference subframe is an uplink subframe that is detected by the base station and that is not sent by the UE, the at least one reference subframe is omitted and is not used for the signaling for triggering the adjustment of the CWS.

It should be understood that a principle of determining, by the base station, the contention window time and the signaling instructing the UE to trigger the adjustment of the CWS is similar to a principle of determining the CWS. Details are not described herein again.

It should be understood that the base station may further send control signaling including a HARQ indication to the UE. The UE may determine the CCA backoff counter initial value of the second uplink burst according to the HARQ indication.

Before the contention window information of the second uplink burst or the clear channel assessment CCA backoff counter initial value generated based on the contention window information is determined, the contention window information of the third uplink burst of the UE or the clear channel assessment CCA backoff counter initial value generated based on the contention window information is determined according to the reference subframe.

Optionally, in this embodiment of the present disclosure, a method for determining a contention window size by a user further includes:

determining the CWS of the third uplink burst of the UE according to the reference subframe before the CWS of the second uplink burst is determined; and determining that the CWS of the second uplink burst is equal to the CWS of the third uplink burst.

The first uplink burst, the second uplink burst, and the third uplink burst are discontinuous in time, the third uplink burst is between the first uplink burst and the second uplink burst, and the third uplink burst includes at least one uplink subframe. If the third uplink burst includes at least two uplink subframes, any two contiguous uplink subframes of the at least two uplink subframes may be continuous in time, or may be discontinuous in time.

It should be understood that when two different uplink bursts, for example, the second uplink burst and the third uplink burst, correspond to a same reference subframe, the base station should avoid additionally increasing or decreasing the CWS when scheduling the two uplink bursts.

It should be understood that the reference subframe is a reference subframe of the UE, and has a slightly different selection rule from that of a reference subframe on a side of the base station. Detailed descriptions are to be provided subsequently.

Optionally, when the control signaling includes the HARQ indication, the determining a CCA backoff counter initial value of the second uplink burst includes:

determining the CWS of the second uplink burst according to at least one hybrid automatic repeat request HARQ indication that is of the reference subframe and that is in the control signaling; and determining the CCA backoff counter initial value of the second uplink burst according to the CWS.

Optionally, determining, by the UE, the CWS of the second uplink burst according to a HARQ indication in the control signaling for the at least one uplink subframe in the reference subframe includes:

when the HARQ indication for the at least one uplink subframe in the reference subframe is received, and at least one HARQ indication is a retransmission indication, increasing the CWS;

when a HARQ indication for each uplink subframe in the reference subframe is received, and each HARQ indication is an initial transmission indication, decreasing the CWS;

when no HARQ indication for each uplink subframe in the reference subframe is received, but the HARQ indication for the at least one uplink subframe in the reference subframe is received, and each HARQ indication is an initial transmission indication, maintaining the CWS unchanged or decreasing the CWS; or when no HARQ indication for the reference subframe is received, maintaining the CWS unchanged or decreasing the CWS.

Further, when the HARQ indication for the at least one uplink subframe in the reference subframe is received, and at least one HARQ indication is a retransmission indication, if each of the at least one uplink subframe is an uplink subframe that is not sent by the UE, the CWS remains unchanged, or each uplink subframe is omitted and not used for adjusting the CWS.

Optionally, determining, by the UE, the CWS of the second uplink burst according to a HARQ indication in the control signaling for the at least one uplink subframe in the reference subframe includes:

when the HARQ indication for the at least one uplink subframe in the reference subframe is received, and the HARQ indication is an initial transmission indication, decreasing the CWS;

when a HARQ indication for each uplink subframe in the reference subframe is received, and each HARQ indication is a retransmission indication, increasing the CWS;

when the HARQ indication for the at least one uplink subframe in the reference subframe is received, and each HARQ indication is a retransmission indication, maintaining the CWS unchanged or decreasing the CWS; or when no HARQ indication for the reference subframe is received, maintaining the CWS unchanged or decreasing the CWS.

Further, when the HARQ indication for each uplink subframe in the reference subframe is received, and each HARQ indication is a retransmission indication, if each uplink subframe is an uplink subframe that is not sent by the UE, the CWS remains unchanged, or each uplink subframe is omitted and not used for adjusting the CWS.

Specifically, when a value set of the CWS is {15, 31, 63}, and the first uplink burst and the second uplink burst of the UE each include two uplink subframes that are continuous in time domain, it is assumed that the two uplink subframes of the first uplink burst are reference subframes of the second uplink burst, and a reference subframe set is {#n, #n+1}.

Figure 8A:
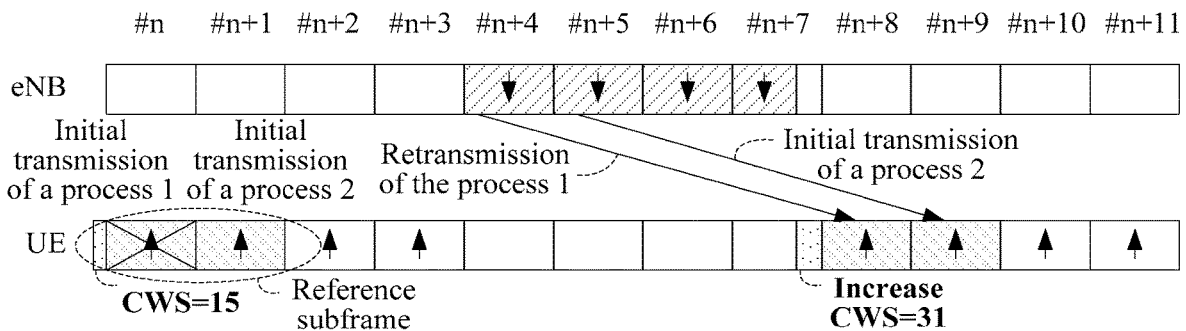
FIG. 8(a) to FIG. 8(d) each are still another schematic diagram of a method for determining a contention window size according to an embodiment of the present disclosure.

As shown in FIG. 8(a), a HARQ process 1 of the UE is transmitted incorrectly in a reference subframe #n, and the base station schedules retransmission of the HARQ process 1. The UE receives UL grant, in which the HARQ process 1 is indicated, and a corresponding NDI is not toggled, determines that the subframe is a retransmission subframe, and therefore, doubles the CWS for sensing.

Figure 8B:
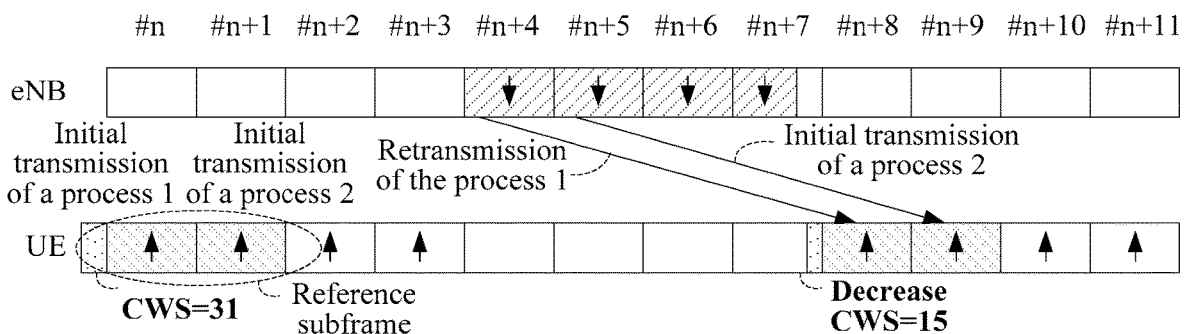

As shown in FIG. 8(b), a HARQ process 1 and a HARQ process 2 of the UE are transmitted correctly in a reference subframe #n and a reference subframe #n+1 respectively, and the base station schedules initial transmission of the two HARQ processes. The UE receives UL grant in which NDIs of the two processes indicated in the UL grant are both toggled, determines that all subframes in a reference set are transmitted correctly, and therefore, decreases the CWS for sensing.

Figure 8C:
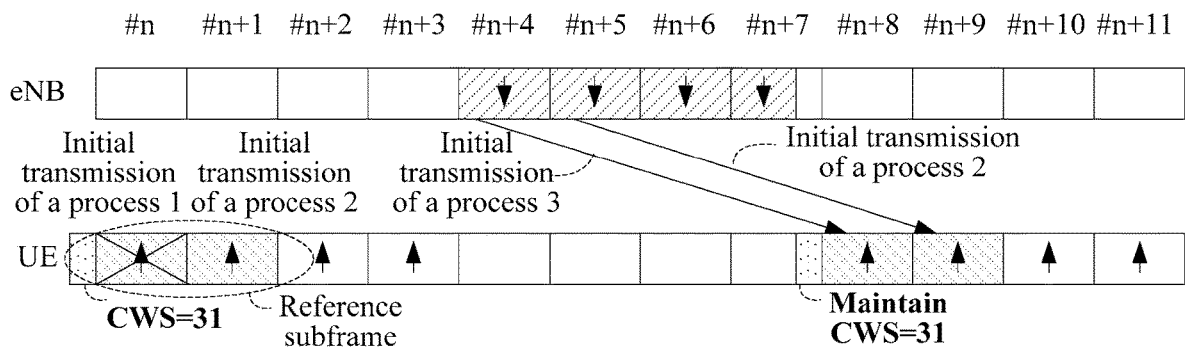

As shown in FIG. 8(c), a HARQ process 1 of the UE is transmitted incorrectly in a reference subframe #n and a HARQ process 2 is transmitted correctly in a reference subframe #n+1, but the base station schedules only transmission of the HARQ process 2 and does not schedule retransmission of the HARQ process 1. The UE does not receive HARQ indications of both the reference subframes, cannot determine whether the HARQ process 1 is transmitted correctly, and therefore, maintains the CWS unchanged or decreases the CWS.

Figure 8D:
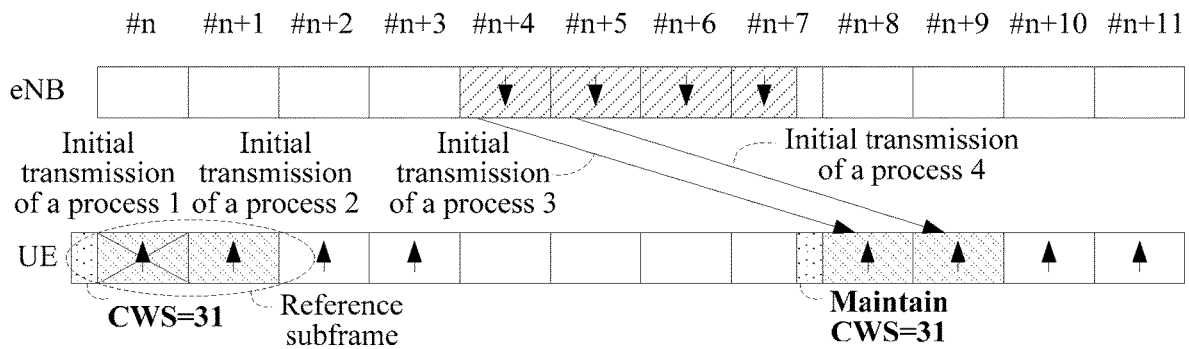

As shown in FIG. 8(d), a HARQ process 1 of the UE is transmitted incorrectly in a reference subframe #n and a HARQ process 2 is transmitted correctly in a reference subframe #n+1, and the base station does not schedule retransmission/initial transmission of both the processes. The UE does not receive a HARQ indication of either of the two reference subframes, cannot determine whether the HARQ process 1 and the HARQ process 2 are transmitted correctly, and therefore, maintains the CWS unchanged or decreases the CWS.

Optionally, determining, by the UE, the CWS of the second uplink burst according to a HARQ indication in the control signaling for the at least one uplink subframe in the reference subframe includes:

when the HARQ indication for the at least one uplink subframe in the reference subframe is received, and a quantity of uplink subframes whose HARQ indications are retransmission is greater than or equal to a first preset threshold, increasing the CWS;

when the HARQ indication for the at least one uplink subframe in the reference subframe is received, and a percentage of a quantity of uplink subframes whose HARQ indications are retransmission in all uplink subframes in the reference subframe is greater than or equal to a second preset threshold, increasing the CWS;

when the HARQ indication for the at least one uplink subframe in the reference subframe is received, and a quantity of uplink subframes whose HARQ indications are initial transmission is greater than or equal to a third preset threshold, decreasing the CWS;

when the HARQ indication for the at least one uplink subframe in the reference subframe is received, and a percentage of a quantity of uplink subframes whose HARQ indications are initial transmission in all uplink subframes in the reference subframe is greater than or equal to a fourth preset threshold, decreasing the CWS; or when the HARQ indication for the at least one uplink subframe in the reference subframe is not received, maintaining the CWS unchanged or decreasing the CWS.

Further, optionally, when the HARQ indication for the at least one uplink subframe in the reference subframe is received, and the quantity of uplink subframes whose HARQ indications are retransmission is less than or equal to the first preset threshold, the CWS remains unchanged or the CWS is to be decreased. When the HARQ indication for the at least one uplink subframe in the reference subframe is received, and the quantity of uplink subframes whose HARQ indications are initial transmission is less than or equal to the third preset threshold, the CWS remains unchanged or the CWS is to be decreased.

Optionally, when the HARQ indication for the at least one uplink subframe in the reference subframe is received, and the percentage of the quantity of uplink subframes whose indications are retransmission in all the uplink subframes in the reference subframe is less than or equal to the second preset threshold, the CWS is to be decreased or the CWS remains unchanged. When the HARQ indication for the at least one uplink subframe in the reference subframe is received, and the percentage of the quantity of uplink subframes whose indications are initial transmission in all the uplink subframes in the reference subframe is less than or equal to the fourth preset threshold, the CWS is to be decreased or the CWS remains unchanged.

Further, in the reference subframe, if at least one reference subframe is an uplink subframe that is not sent by the UE, the at least one reference subframe is omitted and is not used for adjusting the CWS.

The foregoing content mainly describes the method for determining, by the base station, the contention window information of the second uplink burst of the UE according to the reference subframe. The following focuses on elaborating the method for determining a reference subframe by the base station.

It should be understood that before determining the contention window information, the base station may further determine a reference subframe. To determine a reference subframe, an uplink burst that is before the second uplink burst and that may be used as a first uplink burst may be determined first.

Optionally, the first uplink burst is a first uplink burst in which each uplink subframe is sent by the UE and scheduled by the base station.

It should be understood that the first uplink burst is at least one of uplink subframes that are sent by the UE and that are scheduled by the base station. If the first uplink burst includes at least two uplink subframes that are sent by the UE and that are scheduled by the base station, the at least two uplink subframes that are scheduled by the base station may be continuous in time, or may be discontinuous in time.

It should be noted that an uplink subframe in which a user is scheduled by the base station is a cell-specific uplink subframe. However, uplink scheduling of a user by the base station is not necessarily continuous, in some uplink subframes, no user is scheduled, or another user instead of the user is scheduled, and an uplink subframe in which the user is not scheduled cannot reflect a channel state of the user. Therefore, a first uplink burst that is obtained according to a rule of at least one uplink subframe in an uplink subframe scheduled by the base station may be different from a first uplink burst that is obtained based on a rule of all uplink subframes scheduled by the base station, and the former can determine an adjustment of the CWS more accurately.

Figure 9:
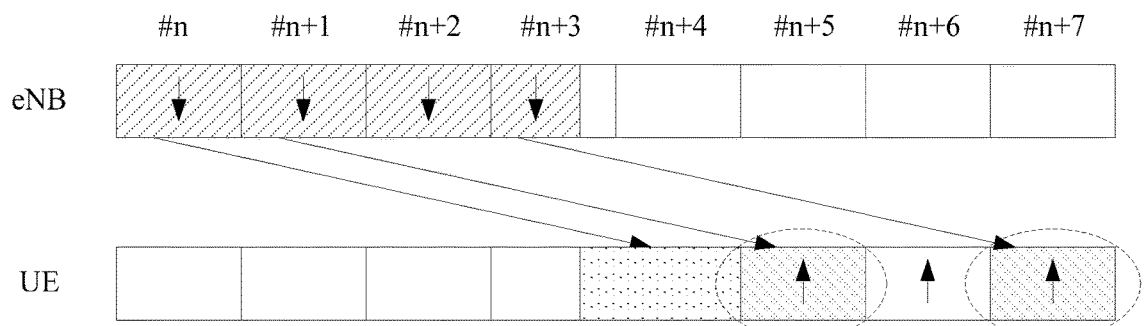
FIG. 9 is a schematic diagram of a first uplink burst according to an embodiment of the present disclosure.

For example, as shown in FIG. 9, a first uplink burst that is selected based on a rule of uplink subframes that are continuous in time is {#n+4, #n+5, #n+6, #n+7}. The base station schedules the UE to send uplink information only in subframes #n+4, #n+5, and #n+7, and does not schedule uplink sending in #n+6, or schedules another UE to perform uplink sending in #n+6. Therefore, two first uplink bursts {#n+4, #n+5} and {#n+7} may be obtained based on a rule of uplink subframes that are continuous in time in uplink subframes scheduled by the base station.

Optionally, the first uplink burst is a first uplink burst in which each uplink subframe is sent by the UE and detected by the base station.

It should be understood that the first uplink burst is at least one of uplink subframes that are actually sent by the UE and that are detected by the base station. To be specific, during determining of the first uplink burst, an uplink subframe in which the UE does not send uplink information and that is detected by the base station is omitted. For example, the UE may not capture any channel, and therefore, does not occupy the uplink subframe, but uses at least one uplink subframe in which the UE actually sends uplink information and that is detected by the base station as the first uplink burst. If the first uplink burst includes at least two uplink subframes that are actually sent by the UE and that are detected by the base station, the at least two uplink subframes that are actually sent by the UE may be continuous in time, or may be discontinuous in time.

It should be understood that an uplink subframe that is actually sent by the UE and that is detected by the base station is an uplink subframe scheduled by the base station, but is not sent because the UE may not capture any channel. Therefore, a first uplink burst that is obtained according to a rule of at least one of uplink subframes that are actually sent by the UE and that are detected by the base station may be different from a first uplink burst that is obtained based on a rule of at least one of uplink subframes scheduled by the base station, and the former may determine a CWS adjustment more accurately.

Figure 10:
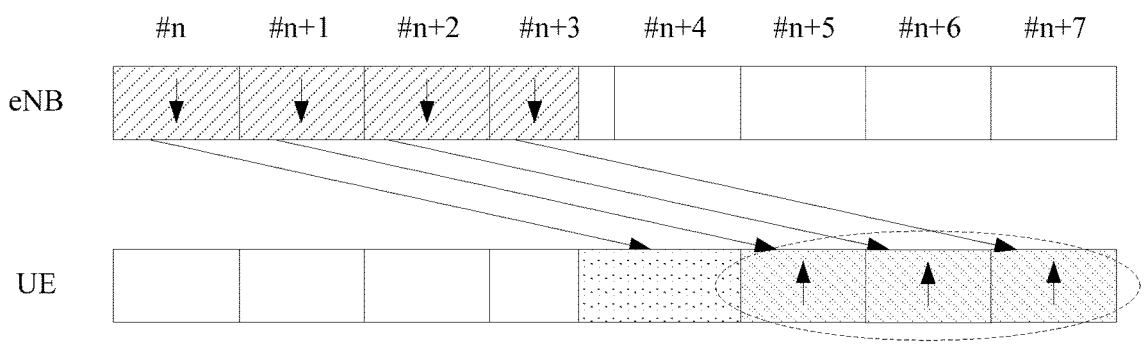
FIG. 10 is another schematic diagram of a first uplink burst according to an embodiment of the present disclosure.

For example, as shown in FIG. 10, the base station schedules the UE to send uplink information in subframes #n+4, #n+5, and #n+7. Therefore, two first uplink bursts {#n+4, #n+5} and {#n+7} are obtained based on a rule of uplink subframes that are continuous in time in uplink subframes scheduled by the base station. Considering that the UE does not capture any channel in a subframe #n+4, but captures a channel in a subframe #n+5 and performs sending, two first uplink bursts that are obtained based on a rule of uplink subframes that are continuous in time in uplink subframes that are actually sent by the UE and that are detected by the base station are {#n+5} and {#n+7}.

It should be understood that in first uplink bursts that are obtained according to a rule of at least one of uplink subframes that are actually sent by the UE and that are detected by the base station, all uplink subframes of all the first uplink bursts are uplink subframes that are actually sent by the UE and that are detected by the base station.

It should be understood that a reference subframe for uplink transmission may be one or more uplink subframes in a first uplink burst received by the base station before scheduling the second uplink burst.

However, during downlink transmission, an ACK/NACK state of each downlink subframe may be obtained by the base station. However, during uplink transmission, if an uplink subframe in the reference subframe is scheduled to the UE, but the UE does not obtain any opportunity to send the subframe, the base station determines, when detecting a physical uplink shared channel (PUSCH), that the receiving fails, that is, a receiving state is NACK.

According to a requirement on the base station in an existing LTE standard release, the base station may not determine whether the state of unsuccessful receiving is caused by a fact that the UE does not send an uplink subframe, or by a fact that the UE sends an uplink subframe but the base station does not detect the uplink subframe because of poor channel quality.

It should be understood that according to implementation of a base station device, some base stations may detect whether the UE sends an uplink subframe.

Specifically, if the base station detects that receiving of the PUSCH fails, the base station further detects a DM-RS of the uplink subframe. Because the reference signal is a code sequence, a probability that the reference signal is successfully detected is much greater than that of PUSCH. If the base station detects that the DM-RS exists, the base station may determine that the unsuccessful receiving on the PUSCH is caused by poor channel quality. If the base station detects no DM-RS, the base station determines that the UE does not actually send an uplink subframe, and therefore, omits, during selection of the reference subframe, an uplink subframe that causes unsuccessful receiving of the PUSCH by the base station because the uplink subframe is not sent by the UE.

Optionally, the reference subframe is at least one uplink subframe sent by the UE and detected by the base station in the first uplink burst.

It should be understood that in the first uplink burst, only the uplink subframe that is actually sent by the UE and that is detected by the base station is reserved as the reference subframe, and the uplink subframe in which the UE does not send uplink information and that is detected by the base station is omitted. For example, the uplink subframe is not occupied by the UE because the UE does not capture any channel.

Figure 11:
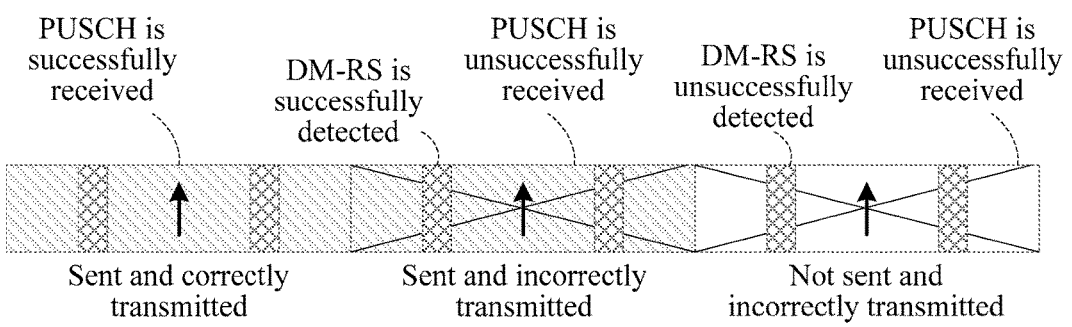
FIG. 11 is a schematic diagram of a receiving state of an uplink subframe according to an embodiment of the present disclosure.

As shown in FIG. 11, when the base station has a capability of detecting and determining whether the UE sends an uplink subframe: if the base station successfully receives the PUSCH and detects the DM-RS, the base station may determine that the UE actually sends an uplink subframe, and determine that a receiving state of the subframe is ACK; if the base station fails to receive the PUSCH and detects the DM-RS, the base station may determine that the UE actually sends an uplink subframe, and determine that a receiving state of the subframe is NACK; if the base station fails to receive the PUSCH and does not detect the DM-RS, the base station may determine that the UE does not send an uplink subframe, and may omit the subframe and not add the subframe to the reference subframe.

It should be further understood that when the base station does not have a capability of detecting whether the UE performs sending, the base station needs to determine that all uplink subframes that are sent by the UE under scheduling and that are included in the first uplink burst are actually sent by the UE. Therefore, receiving states of all uplink subframes in which receiving of PUSCH fails are determined as NACK. In this case, a receiving state of an uplink subframe that is not actually sent by the UE may be incorrectly determined as NACK, causing a determined CWS of the UE to be relatively large.

Optionally, the reference subframe is at least one uplink subframe whose receiving state has been detected by the base station in the first uplink burst.

Optionally, the reference subframe is at least one uplink subframe whose receiving state is obtained by the base station in the first uplink burst.

It should be understood that because there may be a delay in receiving detection of a PUSCH, the base station may not complete, at an uplink subframe end moment at which the control signaling is sent, detecting whether the PUSCH is successfully received. Therefore, to select a reference subframe, the uplink subframe whose receiving state cannot be determined because of the delay in the receiving detection of the PUSCH needs to be excluded.

Figure 12:
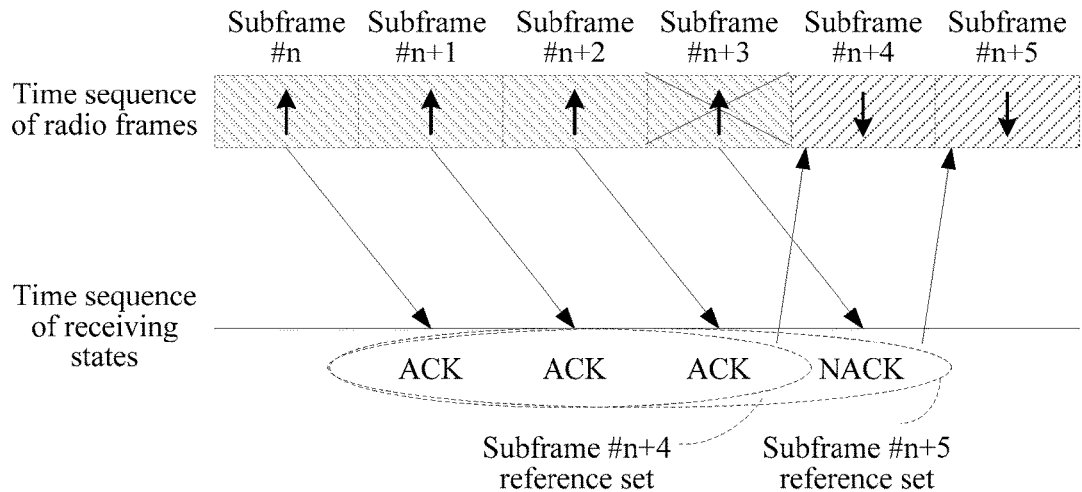
FIG. 12 is a schematic diagram of a delay in receiving detection of an uplink subframe according to an embodiment of the present disclosure.

For example, as shown in FIG. 12, assuming that the receiving state of the at least one uplink subframe in the reference subframe is NACK, the CWS is to be increased; otherwise, the CWS is to be decreased. Because a delay of 1 ms exists in receiving detection performed by the base station, a downlink subframe #n+4 cannot determine a PUSCH receiving state of a last uplink subframe #n+3 in the first uplink burst. Therefore, a reference subframe corresponding to the downlink subframe #n+4 is {#n, #n+1, #n+2}, and the base station sends UL grant to instruct to decrease the CWS. A reference subframe corresponding to a downlink subframe #n+5 is {#n, #n+1, #n+2, #n+3}, and the base station sends UL grant to instruct to increase the CWS.

Optionally, in first uplink bursts, a first uplink burst closest to a downlink subframe in which the base station sends control signaling may be selected. This selection method can reflect an instantaneous channel state in a more timely manner. Alternatively, a plurality of first uplink bursts closest to a downlink subframe in which the base station sends control signaling may be selected. In this selection method, a reference set includes a relatively large quantity of elements, and this can better reflect average performance of a channel state.

Optionally, the reference subframe is at least one uplink subframe in each of at least one first uplink burst closest to the control signaling before the control signaling is sent to the UE.

It should be understood that a first uplink burst that is a first uplink burst closest to the downlink subframe in which the base station sends the control signaling should be selected.

Optionally, the reference subframe is all uplink subframes, a first uplink subframe, or a last uplink subframe in the first uplink burst closest to the control signaling before the control signaling is sent to the UE.

Figure 13A:
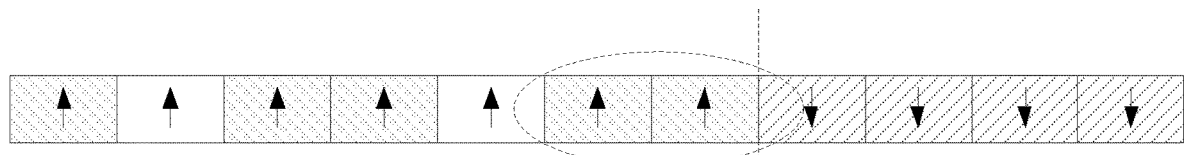
FIG. 13(a) to FIG. 13(c) each are a schematic diagram of a reference subframe according to an embodiment of the present disclosure.

Specifically, selection of an uplink subframe in the first uplink burst may include: as shown in FIG. 13(a), for the reference subframe, all uplink subframes included in a first uplink burst closest to and before a scheduling moment may be selected.

Figure 13B:
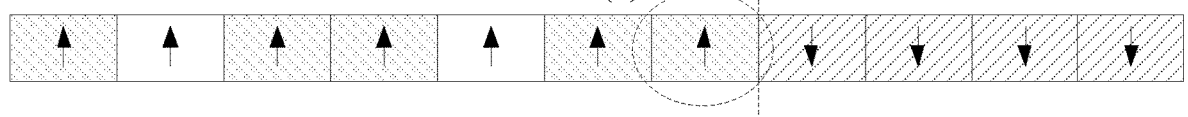

As shown in FIG. 13(b), for the reference subframe, a first uplink subframe in a first uplink burst closest to and before a scheduling moment may be selected.

Figure 13C:
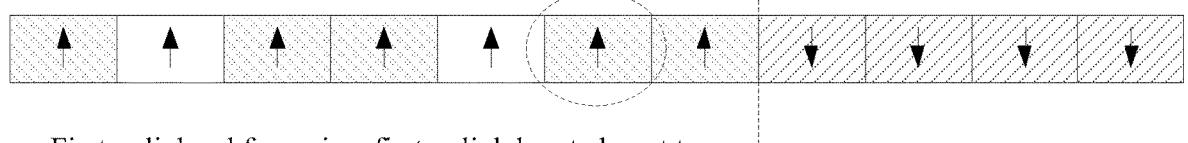

As shown in FIG. 13(c), for the reference subframe, a last uplink subframe in a first uplink burst closest to and before a scheduling moment may be selected.

Optionally, the reference subframe is at least one of uplink subframes that are sent by the UE and that are detected by the base station in a first uplink burst closest to the control signaling before the base station sends the control signaling to the UE. The first uplink burst is a first uplink burst in which each uplink subframe is sent by the UE and scheduled by the base station.

Further, the reference subframe is all uplink subframes, a first uplink subframe, or a last uplink subframe in uplink subframes that are sent by the UE and that are detected by the base station in a first uplink burst closest to the control signaling before the base station sends the control signaling to the UE. The first uplink burst is a first uplink burst in which each uplink subframe is sent by the UE and scheduled by the base station.

It should be understood that in the uplink subframes that are of the UE and that are scheduled by the base station, there may be a subframe that is not occupied by the UE because the UE does not capture any channel.

Therefore, if the first uplink burst is selected according to a rule of at least one uplink subframe in the uplink subframe scheduled by the base station, and the reference subframe is limited to all uplink subframes, a first uplink subframe, or a last uplink subframe in the first burst, these subframes may not meet a limitation that "a reference subframe is each uplink subframe that is sent by the UE and that is detected by the base station in the first uplink burst".

To make both the limitation conditions for the reference subframe met, all uplink subframes, a first uplink subframe, or a last uplink subframe in uplink subframes that are sent by the UE and that are detected by the base station in the first burst may be selected.

For example, the first uplink burst is {#n, #n+1, #n+2, #n+3}. The base station detects that the UE does not send the uplink subframe #n, and the base station detects that #n+1, #n+2, and #n+3 are sent. If a selection rule of a reference subframe is a first uplink subframe in uplink subframes that are sent by the UE and that are detected by the base station in the first burst, a result of the selection is #n+1.

It should be understood that if the first uplink burst does not include an uplink subframe that is sent by the UE and that has been detected by the base station, the first uplink burst is omitted, and a first uplink burst that is closest and that includes at least one uplink subframe that is sent by the UE and that has been detected by the base station.

Optionally, the reference subframe is at least one reference subframe in uplink subframes whose receiving states have been detected by the base station in the first uplink burst closest to the control signaling before the base station sends the control signaling to the UE.

Optionally, the reference subframe is all uplink subframes, a first uplink subframe, or a last uplink subframe in uplink subframes whose receiving states have been detected by the base station in the first uplink burst closest to the control signaling before the base station sends the control signaling to the UE.

It should be understood that there may be an uplink subframe whose receiving state has not been detected by the base station in the first uplink burst because of the delay in the receiving detection of the PUSCH by the base station.

Therefore, if the reference subframe is limited to all uplink subframes, a first uplink subframe, or a last uplink subframe in the first burst, these subframes may not meet a limitation that "a reference subframe is each uplink subframe whose receiving state has been detected by the base station in the first uplink burst".

To make both the limitation conditions for the reference subframe met, all uplink subframes, a first uplink subframe, or a last uplink subframe in uplink subframes whose receiving states have been detected in the first burst may be selected.

For example, the first burst is {#n, #n+1, #n+2, #n+3}. A receiving state of the uplink subframe #n+3 is not detected. If a selection rule of a reference subframe is a last uplink subframe in the uplink subframes whose receiving states have been detected by the base station in the first burst, a result of the selection is #n+3.

It should be understood that if the first uplink burst does not include the uplink subframe whose receiving state has been detected by the base station, the first uplink burst is omitted.

Optionally, the reference subframe is at least one uplink subframe whose receiving state has been detected in a first uplink burst closest to the control signaling before the control signaling is sent to the UE.

Further, the reference subframe is all uplink subframes, a first uplink subframe, or a last uplink subframe whose receiving state has been detected in the first uplink burst closest to the control signaling before the control signaling is sent to the UE.

It should be understood that if a receiving state of at least one uplink subframe in a first uplink burst has not been detected, the first uplink burst is a first uplink burst including an uplink subframe whose receiving state has not been detected, and the first uplink burst is omitted. Otherwise, the first uplink burst is a first uplink burst in which a receiving state has been detected.

Further, the at least one uplink subframe is any uplink subframe, all uplink subframes, a first uplink subframe, or a last uplink subframe in the first uplink burst.

It should be understood that the omitting the first uplink burst in which a receiving state has not been detected by the base station is another method that causes both limitation conditions for the reference subframe to be met.

For example, for two contiguous uplink bursts {#n−5, #n−4, #n−3, #n−2} and {#n, #n+1, #n+2, #n+3}, the uplink burst {#n, #n+1, #n+2, #n+3} is closest to the control signaling sent by the base station, and a receiving state of an uplink subframe #n+3 has not been detected. It is defined that if a receiving state of a last uplink subframe in the uplink burst has not been detected, the uplink burst is an uplink burst in which a receiving state has not been detected. In this case, if a selection rule of a reference subframe is a last uplink subframe whose receiving state has been detected in the first uplink burst closest to the control signaling other than the first uplink burst including an uplink subframe whose receiving state has not been detected, a result of the selection is #n−2.

Figure 14A:
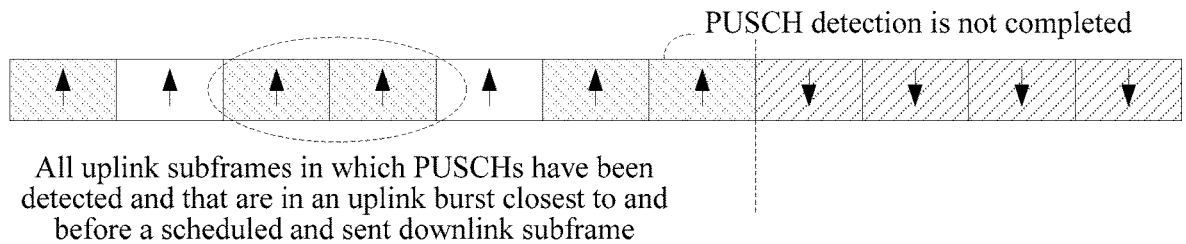
FIG. 14(a) to FIG. 14(c) each are another schematic diagram of a reference subframe according to an embodiment of the present disclosure.

Specifically, when a first uplink burst closest to a downlink subframe in which the control signaling is currently sent other than the first uplink burst including the uplink subframe whose receiving state has not been detected is selected, selection of an uplink subframe in the first uplink burst may include: as shown in FIG. 14(a), for the reference subframe, all uplink subframes in which PUSCHs have been detected and that are in a first uplink burst closest to and before a scheduling moment may be selected.

Figure 14B:
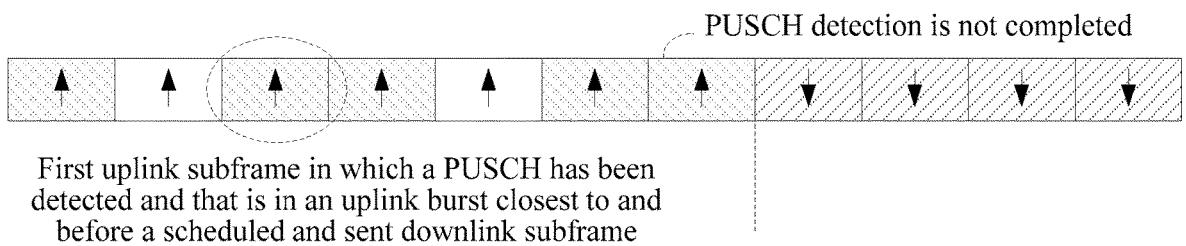

As shown in FIG. 14(b), for the reference subframe, a first uplink subframe in which a PUSCH has been detected and that is in a first uplink burst closest to and before a scheduling moment may be selected.

Figure 14C:
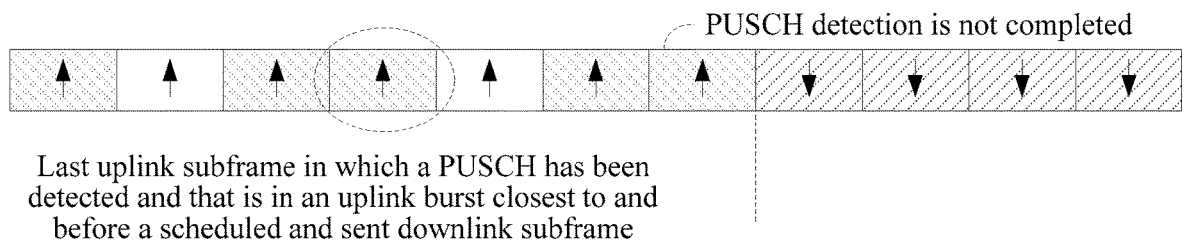

As shown in FIG. 14(c), for the reference subframe, a last uplink subframe in which a PUSCH has been detected and that is in a first uplink burst closest to and before a scheduling moment may be selected.

It should be understood that when the base station selects a plurality of first uplink bursts closest to the downlink subframe in which the control signaling is sent, a method for selecting the plurality of first uplink bursts may be as follows:

The first uplink burst is selected depending on a predefined quantity of first uplink bursts. For example, if the predefined quantity is two, two first uplink bursts closest to the downlink subframe in which the control signaling is sent are selected.

Alternatively, the first uplink burst is selected depending on a predefined time window. An end moment of the time window is a start moment of a downlink subframe in which signaling is currently sent. A length of the time window is a predefined length. The predefined length may be specified in a protocol, or may be proactively configured by an operator, or may be semi-statically or dynamically configured by the base station. For example, if the predefined time window is 5 ms, a plurality of first uplink bursts in a time window 5 ms before a moment of a downlink subframe in which control signaling is sent are selected.

Alternatively, all first uplink bursts between a start moment at which a CWS of the first uplink burst changes and the downlink subframe in which the signaling is sent are selected.

Figure 15:
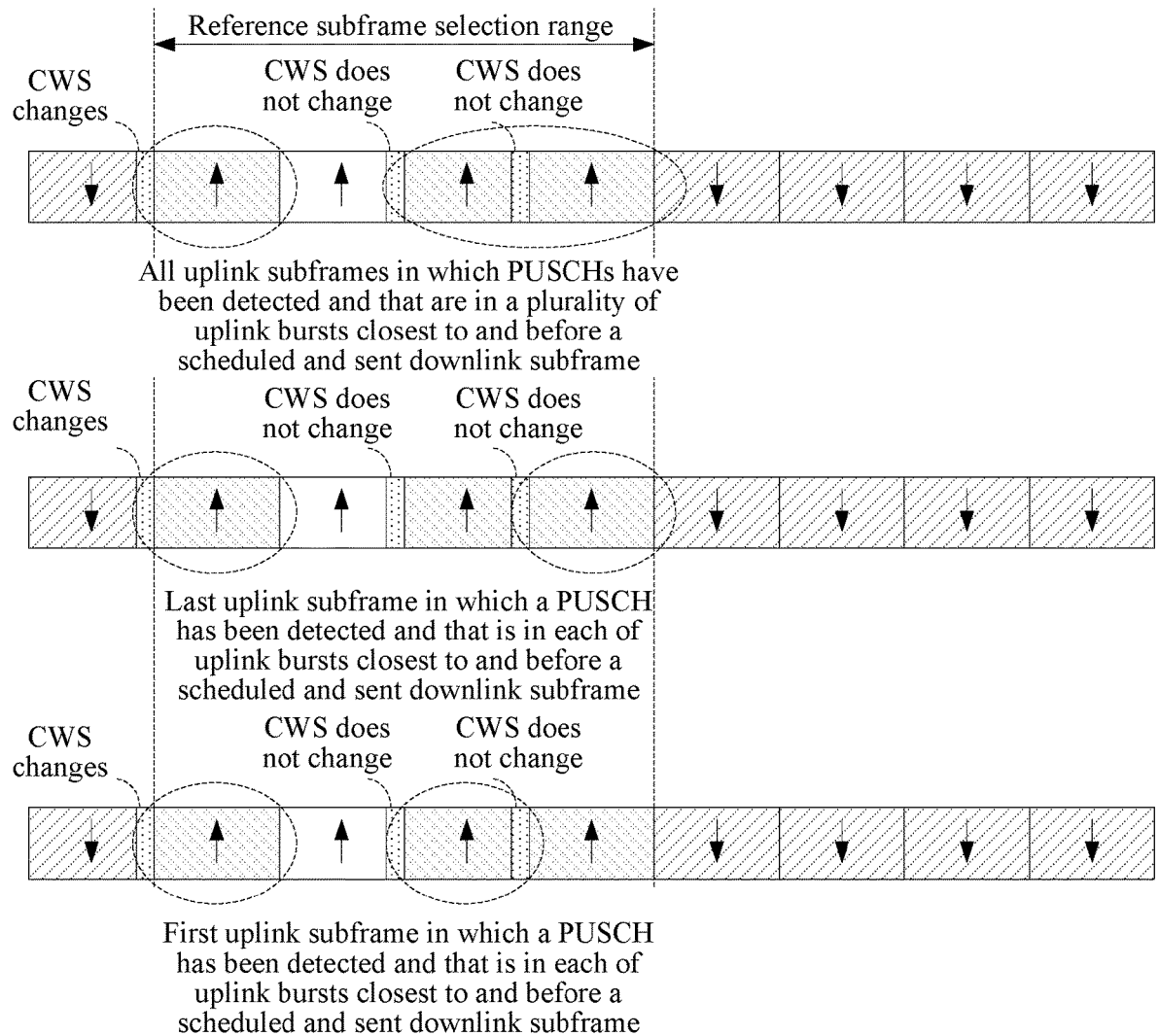
FIG. 15 is another schematic diagram of a reference subframe according to an embodiment of the present disclosure.

For example, as shown in FIG. 15, all first uplink bursts between a previous first uplink burst in which a CWS changes and the downlink subframe in which the signaling is sent are selected. That a CWS changes means: compared with a CWS of a previous uplink burst, a CWS of a current uplink burst changes, that is, a CWS is increased or decreased. The method can ensure that second uplink bursts between two uplink bursts whose CWSs need to be adjusted are all used as references, and overlapping of two sets is avoided.

Optionally, the reference subframe is at least one uplink subframe in each of the at least one first uplink burst closest to the control signaling within a predefined time window and before the control signaling is sent to the UE, where an end moment of the time window is a start moment of a downlink subframe in which the control signaling is sent to the UE.

Optionally, the reference subframe is at least one uplink subframe in each of n first uplink bursts closest to the control signaling before the control signaling is sent to the UE, where n is a preset quantity and n is an integer greater than 1.

Alternatively, the reference subframe is at least one uplink subframe in each of all first uplink bursts between a start moment at which a CWS of the first uplink burst changes and a moment at which the control signaling is sent, and before the control signaling is sent to the UE, where the first uplink burst whose CWS changes is a first uplink burst whose CWS changes and that is closest to the control signaling.

Optionally, the reference subframe is all uplink subframes, a first uplink subframe, or a last uplink subframe in each of the at least one first uplink burst closest to the control signaling within a predefined time window and before the control signaling is sent to the UE, where an end moment of the time window is a start moment at which the control signaling is sent to the UE.

Optionally, the reference subframe is all uplink subframes, a first uplink subframe, or a last uplink subframe in each of n first uplink bursts closest to the control signaling before the control signaling is sent to the UE, where n is a preset quantity and n is an integer greater than 1.

Alternatively, the reference subframe is all uplink subframes, a first uplink subframe, or a last uplink subframe in each of all first uplink bursts between a start moment at which a CWS of the first uplink burst changes and a moment at which the control signaling is sent, and before the control signaling is sent to the UE, where the first uplink burst whose CWS changes is a first uplink burst whose CWS changes and that is closest to the control signaling.

Optionally, the reference subframe may be all uplink subframes, a first uplink subframe, or a last uplink subframe in each of a plurality of first uplink bursts closest to the downlink subframe in which the control signaling is sent.

Specifically, as shown in FIG. 16(a), the reference subframe is all uplink subframes, a first uplink subframe, or a last uplink subframe in each of a plurality of first uplink bursts closest to and before a scheduling moment.

As shown in FIG. 16(b), the reference subframe is a first uplink subframe in each of a plurality of first uplink bursts closest to and before a scheduling moment.

As shown in FIG. 16(c), the reference subframe is a last uplink subframe in each of a plurality of first uplink bursts closest to and before a scheduling moment.

Optionally, the reference subframe is at least one of uplink subframes that are sent by the UE and that are detected by the base station in each of a plurality of first uplink bursts closest to the control signaling before the base station sends the control signaling to the UE. The first uplink burst is a first uplink burst in which each uplink subframe is sent by the UE and scheduled by the base station.

Further, the reference subframe is all uplink subframes, a first uplink subframe, or a last uplink subframe in uplink subframes that are sent by the UE and that are detected by the base station in each of a plurality of first uplink bursts closest to the control signaling before the base station sends the control signaling to the UE. The first uplink burst is a first uplink burst in which each uplink subframe is sent by the UE and scheduled by the base station.

It should be understood that for a case of a plurality of first uplink bursts, a reference subframe to be selected by the base station is all uplink subframes, a first uplink subframe, or a last uplink subframe in uplink subframes that are sent by the UE and that are detected by the base station in the plurality of first bursts. This is the same as the case of one uplink burst. Details are not described herein again.

Optionally, the reference subframe is at least one of uplink subframes whose receiving states have been detected by the base station in the plurality of first uplink bursts closest to the control signaling before the base station sends the control signaling to the UE.

Optionally, the reference subframe is all uplink subframes, a first uplink subframe, or a last uplink subframe in uplink subframes whose receiving states have been detected by the base station in the plurality of first uplink bursts closest to the control signaling before the base station sends the control signaling to the UE.

It should be understood that for a case of a plurality of first uplink bursts, a reference subframe to be selected by the base station is all uplink subframes, a first uplink subframe, or a last uplink subframe in uplink subframes whose receiving states have been detected in the plurality of first bursts. This is the same as the case of one uplink burst. Details are not described herein again.

Optionally, the reference subframe is at least one uplink subframe whose receiving state has been detected in a plurality of first uplink bursts closest to the control signaling before the control signaling is sent to the UE.

Further, the reference subframe is all uplink subframes, a first uplink subframe, or a last uplink subframe whose receiving state has been detected in the plurality of first uplink bursts closest to the control signaling before the control signaling is sent to the UE.

It should be understood that if a receiving state of at least one uplink subframe in a first uplink burst has not been detected, the first uplink burst is a first uplink burst including an uplink subframe whose receiving state has not been detected, and the first uplink burst is omitted. Otherwise, the first uplink burst is a first uplink burst in which a receiving state has been detected. Further, the at least one uplink subframe is any uplink subframe, all uplink subframes, a first uplink subframe, or a last uplink subframe in the first uplink burst.

It should be understood that in a case of selecting a plurality of first uplink bursts, a first uplink burst in which a receiving state has not been detected by the base station is omitted. This is the same as the case of one first uplink burst. Details are not described herein again.

Optionally, the reference subframe is at least one uplink subframe whose receiving state has been detected in a plurality of first uplink bursts closest to the control signaling before the control signaling is sent to the UE.

Further, the reference subframe is all uplink subframes, a first uplink subframe, or a last uplink subframe whose receiving state has been detected in each uplink burst of the plurality of first uplink bursts closest to the control signaling before the control signaling is sent to the UE.

It should be understood that if a receiving state of at least one uplink subframe in a first uplink burst has not been detected, the first uplink burst is a first uplink burst including an uplink subframe whose receiving state has not been detected, and the first uplink burst is omitted. Otherwise, the first uplink burst is a first uplink burst in which a receiving state has been detected.

Further, the at least one uplink subframe is any uplink subframe, all uplink subframes, a first uplink subframe, or a last uplink subframe in the first uplink burst.

It should be understood that in a case of selecting a plurality of first uplink bursts, a first uplink burst in which a receiving state has not been detected by the base station is omitted. This is the same as the case of one first uplink burst. Details are not described herein again.

It should be understood that a plurality of first uplink bursts in which receiving states have been detected are a plurality of first uplink bursts in which uplink PUSCH receiving states of all uplink subframes have been detected. If a receiving state of any subframe has not been detected, the first uplink burst is omitted.

Figure 17A:
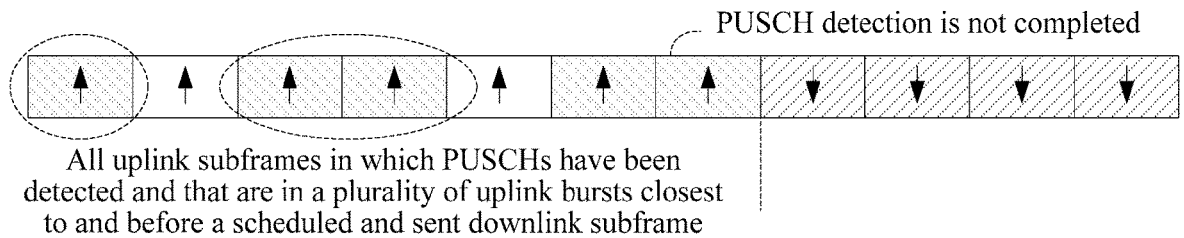
FIG. 17(a) to FIG. 17(c) each are another schematic diagram of a reference subframe according to an embodiment of the present disclosure.
Figure 17B:
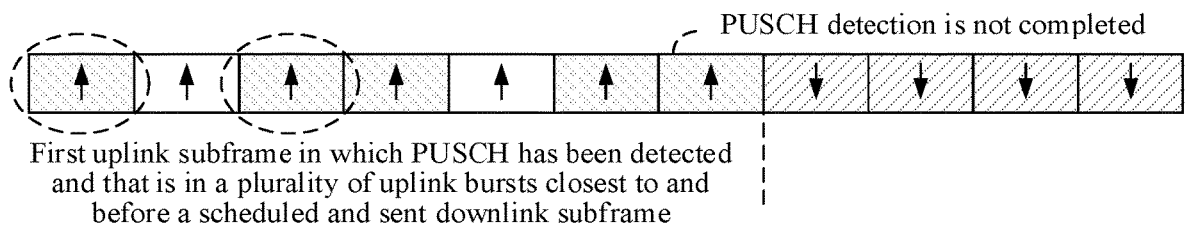
Figure 17C:
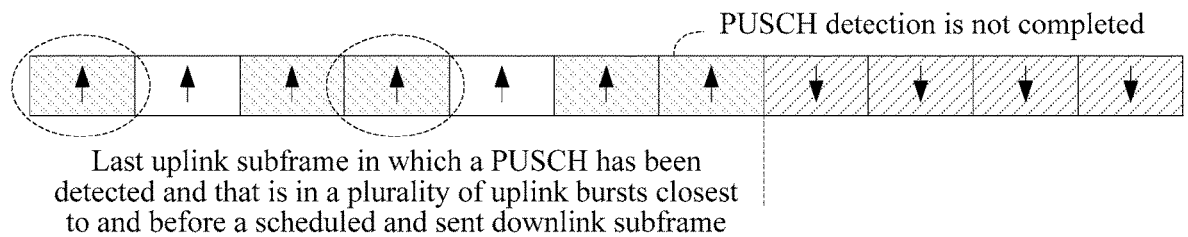

Specifically, as shown in FIG. 17($a$), an uplink burst that includes an uplink subframe whose PUSCH receiving state has not been detected and that is closest to a downlink subframe in which control signaling is currently sent is omitted. The reference subframe is all uplink subframes in each of a plurality of first uplink bursts closest to and before a scheduling moment.

As shown in FIG. 17($b$), an uplink burst that includes an uplink subframe whose PUSCH receiving state has not been detected and that is closest to a downlink subframe in which control signaling is currently sent is omitted. The reference subframe is a first uplink subframe in each of a plurality of first uplink bursts closest to and before a scheduling moment.

As shown in FIG. 17($c$), an uplink burst that includes an uplink subframe whose PUSCH receiving state has not been detected and that is closest to a downlink subframe in which control signaling is currently sent is omitted. The reference subframe is a last uplink subframe in each of a plurality of first uplink bursts closest to and before a scheduling moment.

It should be understood that selection of the reference subframe of the UE may be the same as or may be different from the selection of the reference subframe of the base station.

Optionally, the first uplink burst is a first uplink burst in which each uplink subframe is sent by the UE and scheduled by the base station.

It should be understood that, the first uplink burst that is obtained, during an adjustment of the CWS performed on a side of the UE, according to a rule of at least one of uplink subframes scheduled by the base station is the same as the first uplink burst that obtained during a adjustment of the CWS performed on a side of the base station. Details are not described herein again.

It should be understood that the first uplink burst is at least one of uplink subframes that are actually sent by the UE. To be specific, during determining of the first uplink burst, an uplink subframe that is not sent by the UE is omitted. For example, the UE may not capture any channel, and therefore, does not occupy the uplink subframe, but uses at least one uplink subframe that is actually sent by the UE as the first uplink burst.

During the adjustment of the CWS performed on the side of the UE, the first burst is limited to at least one of uplink subframes in which the UE actually sends information. This is similar to a rule of at least one of uplink subframes in which the UE actually sends information and that are detected by the base station, during the adjustment of the CWS performed on the side of the base station.

However, different from the case in which the base station performs a detection, for example, a DM-RS detection, on an uplink subframe during the adjustment of the CWS performed on the side of the base station, to learn whether the UE actually sends information, the UE does not need to perform a similar operation because the UE knows an uplink subframe in which information is actually sent.

Optionally, the reference subframe is at least one uplink subframe sent by the UE in the first uplink burst.

It should be understood that in the first uplink burst, only the uplink subframe in which the UE actually sends uplink information is reserved as the reference subframe, and the uplink subframe in which the UE does not send uplink information is omitted. For example, the uplink subframe is not occupied by the UE because the UE does not capture any channel. The case in which a reference subframe selected during the adjustment of the CWS performed on the side of the UE is an uplink subframe in which the UE actually sends uplink information is similar to the case in which a reference subframe selected during the adjustment of the CWS performed on the side of the base station is each uplink subframe that is sent by the UE and that is detected by the base station. However, different from the case in which the base station performs a detection, for example, a DM-RS detection, on an uplink subframe during the adjustment of the CWS performed on the side of the base station, to learn whether the UE actually sends information, the UE does not need to perform a similar operation because the UE knows an uplink subframe in which information is actually sent.

Optionally, the reference subframe is at least one uplink subframe whose receiving state is obtained by the UE in the first uplink burst.

It should be understood that the limitation on the first uplink burst by the UE is similar to the limitation on the first uplink burst on the side of the base station, and the first uplink burst may be at least one uplink subframe that is of the UE and that is schedule by the base station. Alternatively, considering that the UE may not capture each uplink subframe scheduled by the base station, the first uplink burst is limited to at least one uplink subframe actually sent by the UE.

However, different from the adjustment of the CWS of the UE on the side of the base station, in the case of adjusting the CWS on the side of the UE, because retransmission scheduling of UL grant by the base station is asynchronous, the UE may not obtain, before a next uplink burst, a receiving state of each subframe in a previous burst.

Therefore, the receiving state that is of the reference subframe and that is obtained by the UE is defined as an initial transmission indication or a retransmission indication that is of the subframe and that is obtained by using the UL grant. Initial transmission represents that the UL grant carries a HARQ process number that is the same as a HARQ process number corresponding to the subframe, and an NDI is toggled. Retransmission represents that the UL grant carries a HARQ process number that is the same as a HARQ process number corresponding to the subframe, and an NDI does not change. The UE may receive HARQ process numbers of only some subframes, or does not receive a HARQ process number of any subframe.

It should be further understood that if the base station does not indicate whether there is initial transmission or retransmission for a reference subframe, the UE cannot accurately determine whether the subframe is correctly transmitted. This affects accuracy of the adjustment of the CWS. Therefore, the reference subframe is further limited to an uplink subframe whose receiving state is obtained by the UE.

Optionally, the first uplink burst is a first uplink burst in which each uplink subframe is used by the UE to send uplink information.

It should be understood that the first uplink burst is uplink subframes that are continuous in time in uplink subframes actually sent by the UE. To be specific, during determining of the first uplink burst, an uplink subframe that is not sent by the UE is omitted. For example, the UE may not capture any channel, and therefore, does not occupy the uplink subframe, but uses uplink subframes that are continuous in time and that are actually sent by the UE as the first uplink burst.

It should be understood that during the adjustment of the CWS performed on the side of the UE, the first burst is limited to uplink subframes that are continuous in time and that are in uplink subframes in which the UE actually sends information. This is similar to a rule of uplink subframes that are continuous in time, that are in uplink subframes in which the UE actually sends information, and that are detected by the base station, during the adjustment of the CWS performed on the side of the base station.

However, different from the case in which the base station performs a detection, for example, a DM-RS detection, on an uplink subframe during the adjustment of the CWS performed on the side of the base station, to learn whether the UE actually sends information, the UE does not need to perform a similar operation because the UE knows an uplink subframe in which information is actually sent.

Optionally, the reference subframe is each uplink subframe in which the UE sends uplink information in the first uplink burst.

It should be understood that in the first uplink burst, only the uplink subframe in which the UE actually sends uplink information is reserved as the reference subframe, and the uplink subframe in which the UE does not send uplink information is omitted. For example, the uplink subframe is not occupied by the UE because the UE does not capture any channel.

It should be further understood that during the adjustment of the CWS performed on the side of the UE, the selected reference subframe is an uplink subframe in which the UE actually sends uplink information. Similarly, during the adjustment of the CWS performed on the side of the base station, the selected reference subframe is each uplink subframe that is sent by the UE and that is detected by the base station. However, different from the case in which the base station performs a detection, for example, a DM-RS detection, on an uplink subframe during the adjustment of the CWS performed on the side of the base station, to learn whether the UE actually sends information, the UE does not need to perform a similar operation because the UE knows an uplink subframe in which information is actually sent.

Optionally, the reference subframe is at least one uplink subframe in each of at least one first uplink burst closest to a start moment at which the second uplink burst is sent, before the UE sends the second uplink burst. The first uplink burst is a first uplink burst in which each uplink subframe is sent by the UE and scheduled by the base station.

Optionally, the reference subframe is all uplink subframes, a first uplink subframe, or a last uplink subframe in each of at least one first uplink burst closest to a start moment at which the second uplink burst is sent, before the UE sends the second uplink burst. The first uplink burst is a first uplink burst in which each uplink subframe is sent by the UE and scheduled by the base station.

Optionally, the reference subframe is at least one of uplink subframes in which the UE sends uplink information and that are in each of at least one first uplink burst closest to a start moment at which the second uplink burst is sent, before the UE sends the second uplink burst.

Further, the reference subframe is all uplink subframes, a first uplink subframe, or a last uplink subframe in uplink subframes in which the UE sends uplink information and that are in each of at least one first uplink burst closest to a start moment at which the second uplink burst is sent, before the UE sends the second uplink burst.

It should be understood that for the case in which the adjustment of the CWS is performed on the side of the UE, the reference subframe selected by the UE is at least one of uplink subframes in which the UE sends uplink information and that are in each of at least one first uplink burst. This is similar to a case in which when the adjustment of the CWS is performed on the side of the base station, at least one reference subframe in uplink subframes, that are sent by the UE, that are detected by the base station, and that are in one or more uplink bursts are selected. Details are not described herein again.

Optionally, the reference subframe is at least one reference subframe in uplink subframes whose receiving states have been obtained by the UE and that are in each of at least one first uplink burst closest to a start moment at which the second uplink burst is sent, before the UE sends the second uplink burst.

Further, the reference subframe is all uplink subframes, a first uplink subframe, or a last uplink subframe in the uplink subframes whose receiving states have been obtained by the UE and that are in each of the at least one first uplink burst closest to the start moment at which the second uplink burst is sent, before the UE sends the second uplink burst.

It should be understood that for the case in which the adjustment of the CWS is performed on the side of the UE, the reference subframe selected by the UE is at least one reference subframe in uplink subframes whose receiving states have been obtained by the UE and that are in each of the at least one first uplink burst. This is similar to a case in which when the adjustment of the CWS is performed on the side of the base station, at least one reference subframe in uplink subframes whose receiving states have been detected by the base station and that are in one or more uplink bursts are selected. Details are not described herein again.

Optionally, the reference subframe is at least one uplink subframe in each of the at least one first uplink burst closest to the start moment at which the second uplink burst is sent, within a predefined time window and before the UE sends the second uplink burst, where an end moment of the time window is a start moment of the second uplink burst of the UE.

Alternatively, the reference subframe is at least one uplink subframe in each of n first uplink bursts closest to a start moment at which the second uplink burst is sent, before the UE sends the second uplink burst, where n is a preset quantity and n is an integer greater than 0.

Alternatively, the reference subframe is at least one uplink subframe in each of all first uplink bursts between a start moment at which a CWS of the first uplink burst changes and a start moment at which the second uplink burst is sent, and before the UE sends the second uplink burst, where the first uplink burst whose CWS changes is a first uplink burst whose CWS changes and that is closest to the start moment, before the UE sends the second uplink burst.

Optionally, the reference subframe is all uplink subframes, a first uplink subframe, or a last uplink subframe in each of the at least one first uplink burst closest to the start moment at which the second uplink burst is sent, within a predefined time window and before the UE sends the second uplink burst, where an end moment of the time window is a start moment of the second uplink burst of the UE.

Alternatively, the reference subframe is all uplink subframes, a first uplink subframe, or a last uplink subframe in each of n first uplink bursts closest to a start moment at which the second uplink burst is sent, before the UE sends the second uplink burst, where n is a preset quantity and n is an integer greater than 1.

Alternatively, the reference subframe is all uplink subframes, a first uplink subframe, or a last uplink subframe in each of all first uplink bursts between a start moment at which a CWS of the first uplink burst changes and a start moment at which the second uplink burst is sent, and before the UE sends the second uplink burst, where the first uplink burst whose CWS changes is a first uplink burst whose CWS changes and that is closest to the start moment, before the UE sends the second uplink burst.

Optionally, the reference subframe is at least one uplink subframe whose receiving state has been obtained in each of at least one first uplink burst closest to the control signaling other than a first uplink burst of an uplink subframe whose receiving state has not been obtained, before the UE sends the second uplink burst.

Further, the reference subframe is all uplink subframes, a first uplink subframe, or a last uplink subframe whose receiving state has been obtained in each of the at least one first uplink burst closest to the control signaling other than the first uplink burst of the uplink subframe whose receiving state has not been obtained, before the UE sends the second uplink burst.

It should be understood that if a receiving state of at least one uplink subframe in a first uplink burst is not obtained, the first uplink burst is a first uplink burst including an uplink subframe whose receiving state is not obtained, and the first uplink burst is omitted. Otherwise, the first uplink burst is a first uplink burst in which a receiving state has been obtained. Further, the at least one uplink subframe is any uplink subframe, all uplink subframes, a first uplink subframe, or a last uplink subframe in the first uplink burst.

It should be understood that the case in which when the CWS is maintained on the side of the UE, the selected reference subframe is at least one uplink subframe whose receiving state has been obtained in each of at least one first uplink burst is similar to the case in which when the CWS is maintained on the side of the base station, at least one uplink subframe whose receiving state has been obtained in one or more first uplink bursts is selected. Details are not described herein again.

Optionally, the reference subframe is at least one uplink subframe in each of at least one first uplink burst closest to a predefined moment before the predefined moment, and the predefined moment is before a start moment of the second uplink burst.

It should be understood that during the adjustment of the CWS performed on the side of the UE, selection of a reference subframe is different from the adjustment of the CWS performed by the base station in one aspect. During the adjustment of the CWS, the base station can obtain only a receiving state of an uplink subframe before a scheduled downlink subframe. However, considering a scheduling delay of 4 ms, a user not only may obtain the uplink subframe before the scheduled downlink subframe, but also may obtain, when the base station uses cross-carrier scheduling, a HARQ indication of an uplink subframe that overlaps a downlink burst.

Figure 18:
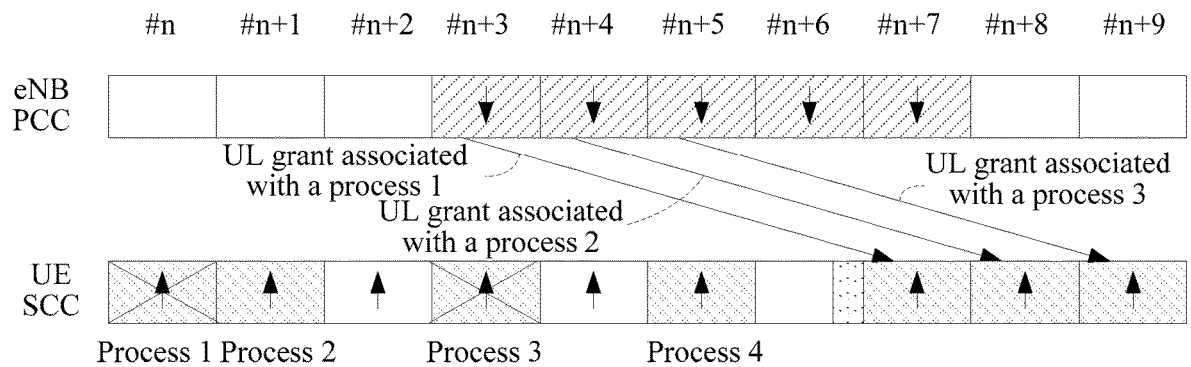
FIG. 18 is still another schematic diagram of a reference subframe according to an embodiment of the present disclosure.

Specifically, as shown in FIG. 18, it is assumed that the base station may obtain a receiving state of an uplink subframe that is 1 ms before, for example, #n+3, and initiates retransmission scheduling in a next downlink subframe, for example, #n+5. In this case, a user may use {#n, #n+1, #n+3} as a reference set before the user performs CCA for an uplink subframe #n+7. However, considering receiving detection delays of the base station and the UE, the UE cannot add all uplink subframes before a start moment of the first uplink burst to the reference set. For example, a HARQ process 4 at a moment #n+5 may be indicated by the base station to the UE earliest at a moment #n+7. Therefore, #n+5 cannot be added to the reference set.

Therefore, selection of an uplink reference subframe may be limited to an uplink subframe before a fifth predefined moment. The predefined moment is before the start moment of the first uplink burst of the UE, and an interval between the predefined moment and the start moment of the first uplink burst of the UE is predefined duration. Further, the predefined duration is a receiving detection delay of the base station and/or the UE, and the predefined duration is specified in a protocol or determined locally by the UE. The predefined duration is, for example, 1 ms to 4 ms.

Optionally, the reference subframe is all uplink subframes, a first uplink subframe, or a last uplink subframe in each of at least one first uplink burst closest to a predefined moment before the predefined moment, and the predefined moment is before a start moment of the second uplink burst.

Optionally, the reference subframe is at least one of uplink subframes in which the UE sends uplink information and that are in each of at least one first uplink burst closest to a predefined moment before the predefined moment. The first uplink burst is a first uplink burst in which each uplink subframe is sent by the UE and scheduled by the base station.

Further, the reference subframe is all uplink subframes, a first uplink subframe, or a last uplink subframe in uplink subframes in which the UE sends uplink information and that are in each of at least one first uplink burst closest to a predefined moment before the predefined moment. The first uplink burst is a first uplink burst in which each uplink subframe is sent by the UE and scheduled by the base station.

Optionally, the reference subframe is at least one reference subframe in uplink subframes whose receiving states have been obtained by the UE and that are in each of at least one first uplink burst closest to a predefined moment before the predefined moment.

Further, the reference subframe is all uplink subframes, a first uplink subframe, or a last uplink subframe in uplink subframes whose receiving states have been obtained by the UE and that are in each of at least one first uplink burst closest to a predefined moment before the predefined moment.

Optionally, the reference subframe may alternatively be at least one uplink subframe whose receiving state has been obtained in each of at least one first uplink burst closest to the control signaling, before the UE sends the second uplink burst.

Further, the reference subframe is all uplink subframes, a first uplink subframe, or a last uplink subframe whose receiving state has been obtained in each of at least one first uplink burst closest to the control signaling, before the UE sends the second uplink burst.

It should be understood that if a receiving state of at least one uplink subframe in a first uplink burst is not obtained, the first uplink burst is a first uplink burst including an uplink subframe whose receiving state is not obtained, and the first uplink burst is omitted. Otherwise, the first uplink burst is a first uplink burst in which a receiving state has been obtained. Further, the at least one uplink subframe is any uplink subframe, all uplink subframes, a first uplink subframe, or a last uplink subframe in the first uplink burst.

Optionally, the reference subframe is all uplink subframes, a first uplink subframe, or a last uplink subframe in each of at least one first uplink burst closest to the predefined moment within a predefined time window, and an end moment of the predefined time window is the predefined moment.

Alternatively, the reference subframe is all uplink subframes, a first uplink subframe, or a last uplink subframe in each of n first uplink bursts closest to a predefined moment before the predefined moment, and the predefined moment is before a start moment of the second uplink burst, where n is a preset quantity and n is an integer greater than 0.

Alternatively, the reference subframe is all uplink subframes, a first uplink subframe, or a last uplink subframe in each of all first uplink bursts between a start moment at which a CWS of the first uplink burst changes and the predefined moment before the predefined moment, where the first uplink burst whose CWS changes is a first uplink burst whose CWS changes and that is closest to and before the predefined moment.

It should be understood that the UE receives at least one piece of control signaling sent by the base station. Each of the at least one piece of control signaling includes contention window information, a clear channel assessment CCA backoff counter initial value generated based on contention window information, or a hybrid automatic repeat request HARQ indication. The UE determines a CWS of the second uplink burst according to a HARQ indication in the at least one piece of control signaling for at least one uplink subframe in a reference subframe. The UE determines the CCA backoff counter initial value of the second uplink burst according to the CWS of the second uplink burst. The at least one piece of control signaling is control signaling carrying control information for the UE, and may be used for scheduling at least one uplink subframe in the second uplink burst or may be used for scheduling another uplink subframe outside the second uplink burst. For example, control signaling in a downlink subframe #n schedules the UE to send a second uplink burst, and the second uplink burst includes an uplink subframe #n+4. Control signaling in a downlink subframe #n+2 schedules the UE to send another uplink burst after the second uplink burst, and the another uplink burst includes an uplink subframe #n+6. In this case, the UE may also determine a CWS of the second uplink burst according to a HARQ indication included in the control signaling in the downlink subframe #n+2.

It should be understood that if the UE determines a CWS of the third uplink burst according to a same reference subframe and before the second uplink burst, when the UE needs to determine the CWS of the second uplink burst according to the reference subframe, the UE determines that the CWS of the second uplink burst is the same as the CWS of the third uplink burst. In other words, when the second uplink burst and the third uplink burst correspond to a same reference subframe, the CWS of the second uplink burst is made the same as that of the third uplink burst and does not need to be adjusted again. Considering that when reference subframes of two contiguous or non-contiguous uplink bursts are a same uplink subframe, if CWSs of the two uplink bursts are adjusted by using a HARQ receiving state of a transport block in the reference subframe, a CWS of the latter uplink burst is adjusted repeatedly. For example, if the receiving state of the transport block in the reference subframe is NACK, the UE increases the CWS according to NACK, and repeatedly increases the CWS according to the NACK before sending the second uplink burst. Consequently, the CWS for the second uplink burst is adjusted to be relatively large. To avoid the problem of repeatedly adjusting a CWS, when two uplink bursts that are discontinuous in time correspond to a same reference subframe, a CWS of the latter uplink burst, that is, a second uplink burst, should be made equal to that of the former uplink burst, that is, a CWS of a third uplink burst. Alternatively, if a third uplink burst and a second uplink burst are two uplink bursts that are sequentially contiguous but are discontinuous in time, and the two uplink bursts correspond to a same reference subframe, a CWS of the second uplink burst remains unchanged or is the same as that of the third uplink burst.

It should be understood that the third uplink burst is a third uplink burst in which each uplink subframe is sent by the UE and scheduled by the base station. To be specific, the third uplink burst is an uplink burst including at least one of uplink subframes that are sent by the UE and that are scheduled by the base station. Alternatively, the third uplink burst is a third uplink burst in which each uplink subframe is used by the UE to send uplink information. To be specific, the third uplink burst is an uplink burst including an uplink subframe actually sent by the UE.

Optionally, that the third uplink burst and the second uplink burst correspond to a same reference subframe includes: a time interval between at least one uplink subframe in the third uplink burst and a first uplink subframe in the second uplink burst is less than first preset duration. Considering that to make a third uplink burst and a second uplink burst correspond to a same reference subframe between the two uplink bursts, a time interval between the third uplink burst and the second uplink burst needs to be relatively short, to be specific, less than the first preset duration, the UE does not receive a HARQ receiving state sent by the base station for an uplink subframe in the third uplink burst. Otherwise, if the time interval between the third uplink burst and the second uplink burst is relatively long, the UE may receive the HARQ receiving state for the uplink subframe in the third uplink burst, and may determine the uplink subframe in the third uplink burst as the reference subframe. In this case, the reference subframe corresponding to the second uplink burst is different from the reference subframe corresponding to the third uplink burst. For example, the first preset duration may be 3 ms, 4 ms, or 5 ms. The at least one uplink subframe in the third uplink burst may be one uplink subframe in the third uplink burst, and more specifically, may be a first uplink subframe or a last uplink subframe in the third uplink burst. The at least one uplink subframe may be of the UE and scheduled by the base station, or may be actually occupied by the UE and used for sending information. For example, the third uplink burst includes uplink subframes #n and #n+1 that are sent by the UE and that are scheduled by the base station. The UE does not capture any channel before #n but captures a channel before #n+1, and occupies #n+1. In this case, the at least one uplink subframe may be #n (a first uplink subframe scheduled by the base station), or may be #n+1 (a first uplink subframe actually occupied by the UE and used for sending information). A first uplink subframe of the second uplink burst is a first uplink subframe that is of the UE and that is scheduled by the base station.

Optionally, that the third uplink burst and the second uplink burst correspond to a same reference subframe further includes: for UL grant that is closest to and before the second uplink burst and that is received by the UE, a moment at which the UE receives the uplink grant UL grant is earlier than the at least one uplink subframe in the third uplink burst, or a moment at which the UE receives the UL grant is not earlier than the at least one uplink subframe in the third uplink burst, and a time interval between the at least one uplink subframe and the moment at which the UE receives the UL grant is less than the second preset duration. Considering that the UE determines a CWS according to HARQ information included in the received UL grant on a downlink control channel, therefore, even if a time interval between the third uplink burst and the second uplink burst is long, UL grant that is sent by the base station and that can be received by the UE before sending the second uplink burst is not at a moment that is long after the third uplink burst. Therefore, the base station cannot demodulate a receiving state of the at least one subframe in the third uplink burst before sending the UL grant. Consequently, the UE still cannot receive HARQ information of the at least one subframe, and cannot use the at least one subframe as the reference subframe. Therefore, a reference subframe closer to the former uplink burst in time is selected, and is the same as a reference subframe of the third uplink burst. Specifically, when the moment at which the UE receives the UL grant is before the third uplink burst, or when the moment at which the UE receives the UL grant is after the third uplink burst but a time interval between the moment and at least one subframe in the third uplink burst is extremely short (the time interval between the two is less than the second preset duration), the UE cannot use the uplink subframe in the third uplink burst as a reference subframe of the second uplink burst. The moment at which the UE receives the UL grant may include a subframe in which the UE receives the UL grant. Specifically, the subframe may be a downlink subframe of the UL grant of an $N^{th}$ subframe after a downlink subframe of the UL grant. For example, N may be equal to 1 or 2. If the subframe in which the UE receives the UL grant is the $N^{th}$ subframe after the downlink subframe of the UL grant, a subframe that is of the UL grant received by the UE and that is closest to the second uplink burst is at least N subframes before a start moment of the second uplink burst. For example, if a first subframe of the second uplink burst is #n, and N=2, the subframe of the UL grant is before #n−2.

Figure 23A:
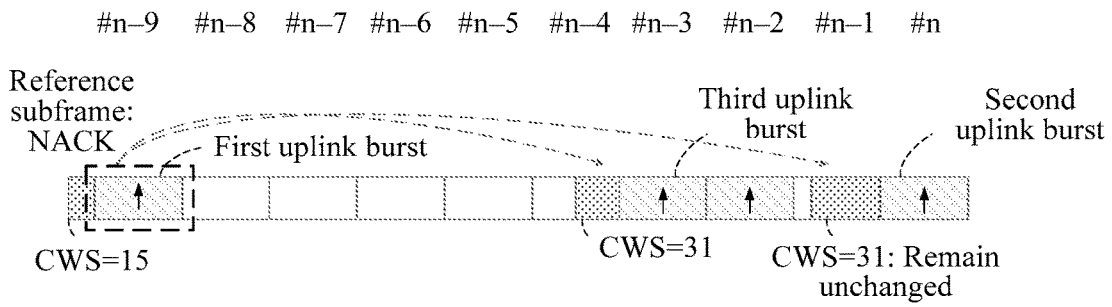
FIG. 23(a) to FIG. 23(c) each are still another schematic diagram of a reference subframe according to an embodiment of the present disclosure.

As shown in FIG. 23(a), it is assumed that the first uplink burst includes a subframe #n−9, the second uplink burst includes a subframe #n, the third uplink burst includes subframes #n−3 and #n−2, at least one subframe in the third uplink burst is a first subframe, that is, #n−3, of the third uplink burst, and first preset duration is 4 ms. A time interval between a first subframe #n of the second uplink burst and the first subframe #n−3 of the third uplink burst is 3 ms and is less than the first preset duration. Therefore, reference subframes corresponding to the second uplink burst and the third uplink burst are all the subframe #n−9 in the first uplink burst. In this case, the CWS of the second uplink burst should be the same as the CWS of the third uplink burst. In other words, the CWS remains unchanged.

Figure 23B:
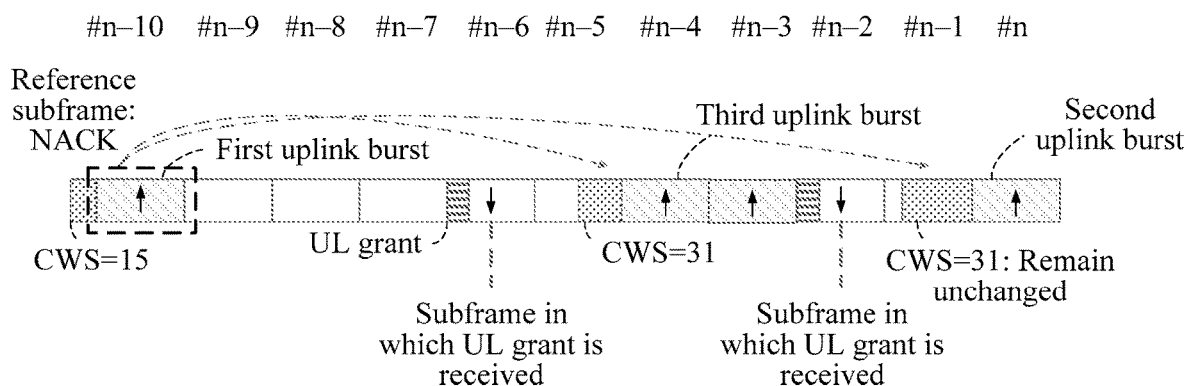

As shown in FIG. 23(b), it is assumed that the first uplink burst includes a subframe #n−10, the second uplink burst includes a subframe #n, the third uplink burst includes subframes #n−4 and #n−3, at least one subframe in the third uplink burst is a first subframe, that is, #n−4, of the third uplink burst, second preset duration is 3 ms, UL grant that is closest to the third uplink burst and that is received by the UE before the third uplink burst is in a subframe #n−6, and the UE receives, in a subframe #n−2, UL grant that is before the second uplink burst and that is closest to the second uplink burst. #n−2 is after the first subframe #n−4 of the third uplink burst, and a time interval between #n−2 and #n−4 is 2 ms and is less than the second preset duration. Therefore, reference subframes corresponding to the second uplink burst and the third uplink burst are all the subframe #n−10 in the first uplink burst. In this case, the CWS of the second uplink burst should be the same as the CWS of the third uplink burst. In other words, the CWS remains unchanged.

Figure 23C:
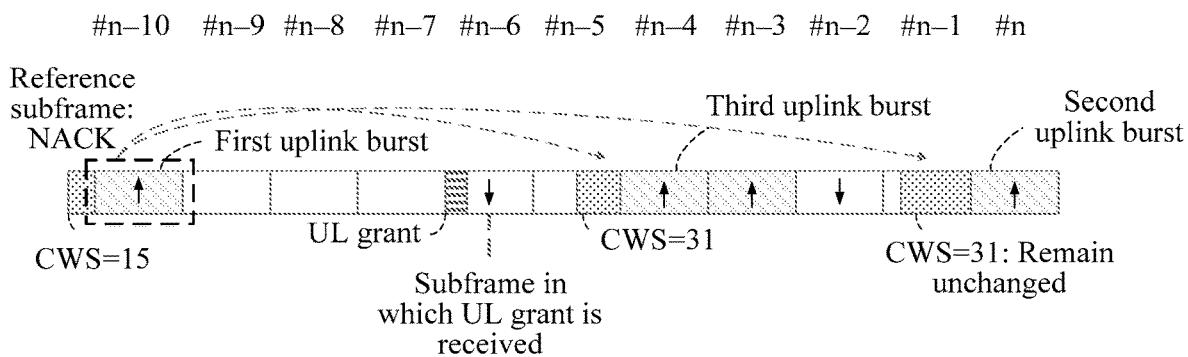

As shown in FIG. 23(c), it is assumed that the first uplink burst includes a subframe #n−10, the second uplink burst includes a subframe #n, the third uplink burst includes subframes #n−4 and #n−3, at least one subframe in the third uplink burst is a first subframe, that is, #n−4, of the third uplink burst, UL grant that is closest to the third uplink burst and that is received by the UE before the third uplink burst is in a subframe #n−6, and the UE receives, in the subframe #n−6, UL grant that is before the second uplink burst and that is closest to the second uplink burst. #n−6 is before the first subframe #n−4 of the third uplink burst. Therefore, reference subframes corresponding to the second uplink burst and the third uplink burst are all the subframe #n−10 in the first uplink burst. In this case, the CWS of the second uplink burst should be the same as the CWS of the third uplink burst. In other words, the CWS remains unchanged.

Therefore, according to the method for determining contention window information in this embodiment of the present disclosure, the contention window information of the second uplink burst of the UE can be determined by using the receiving state of the reference subframe, so that the UE can obtain appropriate contention window information, and fair channel access can be implemented through channel sensing based on random backoff.

Figure 19:
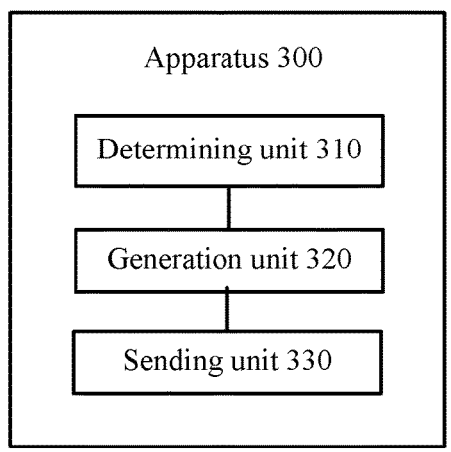
FIG. 19 is a schematic block diagram of an apparatus for determining contention window information according to an embodiment of the present disclosure.

FIG. 19 shows an apparatus 300 for determining contention window information according to an embodiment of the present disclosure. The apparatus 300 shown in FIG. 19 includes a determining unit 310, a generation unit 320, and a sending unit 330.

The determining unit 310 is configured to determine contention window information of a second uplink burst of a user equipment (UE) according to a receiving state of a reference subframe, where the contention window information includes a contention window size CWS, a contention window time, or signaling instructing the UE to trigger a CWS adjustment.

The generation unit 320 is configured to generate at least one piece of control signaling for scheduling at least one uplink subframe in the second uplink burst, where each of the at least one piece of control signaling includes the contention window information or a clear channel assessment CCA backoff counter initial value generated based on the contention window information.

The sending unit 330 is configured to send the at least one piece of control signaling to the UE.

The reference subframe includes at least one uplink subframe in at least one first uplink burst of the UE, the first uplink burst is before the second uplink burst, the second uplink burst and the first uplink burst are discontinuous in time, the first uplink burst includes at least one uplink subframe, and the second uplink burst includes at least one uplink subframe.

Optionally, the determining unit 310 is further configured to:

when a receiving state of at least one uplink subframe in the reference subframe is NACK, increase the CWS; otherwise, decrease the CWS; or when a receiving state of each uplink subframe in the reference subframe is NACK, increase the CWS; otherwise, decrease the CWS.

Optionally, the determining unit 310 is further configured to:

determine a CWS of a third uplink burst of the UE according to the reference subframe before the CWS of the second uplink burst is determined; and determine that the CWS of the second uplink burst is equal to the CWS of the third uplink burst.

The first uplink burst, the second uplink burst, and the third uplink burst are discontinuous in time, the third uplink burst is between the first uplink burst and the second uplink burst, and the third uplink burst includes at least one uplink subframe.

It should be understood that the apparatus 300 herein is represented in a form of a functional unit. The term "unit" herein may refer to an application-specific integrated circuit (ASIC), an electronic circuit, a processor for performing one or more software or firmware programs (for example, a shared processor, a proprietary processor, or a packet processor), a combined logic circuit, and/or another appropriate component supporting the described function. In an optional example, a person skilled in the art may understand that the apparatus 300 may be specifically the base station in the foregoing embodiment. The apparatus 300 may be configured to perform procedures and/or steps in the foregoing method embodiment that correspond to the base station. To avoid repetition, details are not described herein again.

Figure 20:
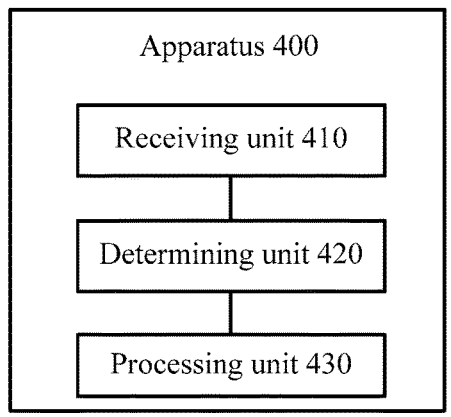
FIG. 20 is another schematic block diagram of an apparatus for determining contention window information according to an embodiment of the present disclosure.

FIG. 20 shows an apparatus 400 for determining contention window information according to an embodiment of the present disclosure. The apparatus 400 includes:

a receiving unit 410, configured to receive at least one piece of control signaling sent by a base station for scheduling at least one uplink subframe in a second uplink burst, where each of the at least one piece of control signaling includes contention window information, a clear channel assessment CCA backoff counter initial value generated based on contention window information, or a hybrid automatic repeat request HARQ indication, and the contention window information includes a contention window size CWS, a contention window time, or signaling instructing the UE to trigger a CWS adjustment;

a determining unit 420, configured to determine a CCA backoff counter initial value of the second uplink burst according to the at least one piece of control signaling; and a processing unit 430, configured to perform CCA for the second uplink burst according to the CCA backoff counter initial value of the second uplink burst.

Optionally, the determining unit 420 is further configured to: determine a CCA backoff counter initial value of a first uplink subframe of the second uplink burst according to contention window information included in control signaling closest to the second uplink burst and before the second uplink burst or a CCA backoff counter initial value generated based on the contention window information; or determine a CCA backoff counter initial value of a first uplink subframe of the second uplink burst according to contention window information included in control signaling of the first uplink subframe in the second uplink burst or a CCA backoff counter initial value generated based on the contention window information.

Optionally, the determining unit 420 is further configured to: determine a CWS of the second uplink burst according to a HARQ indication in the at least one piece of control signaling for at least one uplink subframe in a reference subframe; and determine the CCA backoff counter initial value of the second uplink burst according to the CWS.

The reference subframe includes at least one uplink subframe in at least one first uplink burst of the UE, the first uplink burst is before the second uplink burst, the second uplink burst and the first uplink burst are discontinuous in time, the first uplink burst includes at least one uplink subframe, and the second uplink burst includes at least one uplink subframe.

Optionally, the determining unit 420 is further configured to:

when the HARQ indication for the at least one uplink subframe in the reference subframe is received, and at least one HARQ indication is a retransmission indication, increase the CWS;

when a HARQ indication for each uplink subframe in the reference subframe is received, and each HARQ indication is an initial transmission indication, decrease the CWS;

when no HARQ indication for each uplink subframe in the reference subframe is received, but the HARQ indication for the at least one uplink subframe in the reference subframe is received, and each HARQ indication is an initial transmission indication, maintain the CWS unchanged or decrease the CWS; or when the HARQ indication for the at least one uplink subframe in the reference subframe is not received, maintain the CWS unchanged or decrease the CWS.

Optionally, the determining unit 420 is further configured to:

determine a CWS of a third uplink burst of the UE according to the reference subframe before the CWS of the second uplink burst is determined; and determine that the CWS of the second uplink burst is equal to the CWS of the third uplink burst.

The first uplink burst, the second uplink burst, and the third uplink burst are discontinuous in time, the third uplink burst is between the first uplink burst and the second uplink burst, and the third uplink burst includes at least one uplink subframe.

It should be understood that the apparatus 400 herein is represented in a form of a functional unit. The term "unit" herein may refer to an application-specific integrated circuit (ASIC), an electronic circuit, a processor for performing one or more software or firmware programs (for example, a shared processor, a proprietary processor, or a packet processor), a combined logic circuit, and/or another appropriate component supporting the described function. In an optional example, a person skilled in the art may understand that the apparatus 400 may be specifically the user equipment in the foregoing embodiment. The apparatus 400 may be configured to perform procedures and/or steps in the foregoing method embodiment that correspond to the user equipment. To avoid repetition, details are not described herein again.

Figure 21:
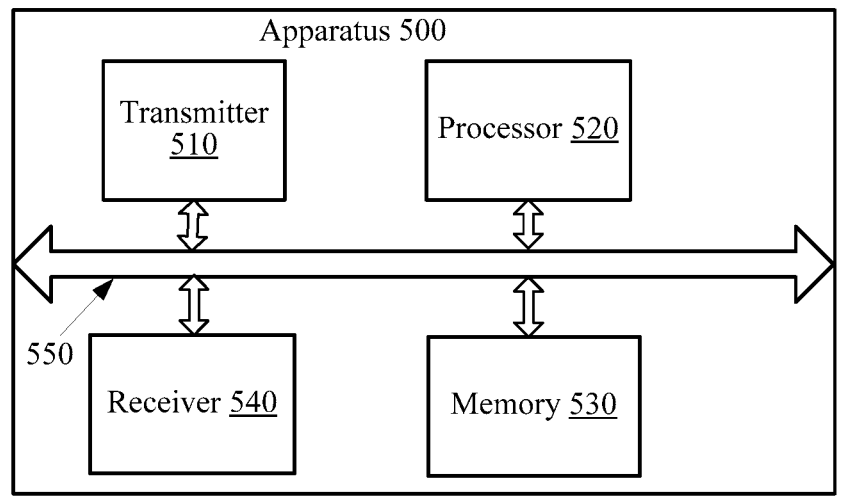
FIG. 21 is another schematic block diagram of an apparatus for determining contention window information according to an embodiment of the present disclosure.

FIG. 21 shows an apparatus 500 for determining contention window information according to an embodiment of the present disclosure. The apparatus may be a base station. The apparatus 500 may include a processor 520 and a transmitter 510.

The processor 520 is configured to: determine contention window information of a second uplink burst of a user equipment (UE) according to a receiving state of a reference subframe, where the contention window information includes a contention window size CWS, a contention window time, or signaling instructing the UE to trigger a CWS adjustment; and generate at least one piece of control signaling for scheduling at least one uplink subframe in the second uplink burst, where each of the at least one piece of control signaling includes the contention window information or a clear channel assessment CCA backoff counter initial value generated based on the contention window information.

The transmitter 510 is configured to send the at least one piece of control signaling to the UE.

The reference subframe includes at least one uplink subframe in at least one first uplink burst of the UE, the first uplink burst is before the second uplink burst, the second uplink burst and the first uplink burst are discontinuous in time, the first uplink burst includes at least one uplink subframe, and the second uplink burst includes at least one uplink subframe.

Optionally, the processor 520 is further configured to:

when a receiving state of at least one uplink subframe in the reference subframe is NACK, increase the CWS; otherwise, decrease the CWS; or when a receiving state of each uplink subframe in the reference subframe is NACK, increase the CWS; otherwise, decrease the CWS.

Optionally, the processor 520 is further configured to:

in the reference subframe, when a quantity of uplink subframes whose receiving states are NACK is greater than a first preset threshold, or when a percentage of uplink subframes whose receiving states are NACK in all uplink subframes is greater than a second preset threshold, increase the CWS;

when a quantity of uplink subframes whose receiving states are NACK is less than a first preset threshold, or when a percentage of a quantity of uplink subframes whose receiving states are NACK in a quantity of all uplink subframes is less than a second preset threshold, decrease the CWS; or when a quantity of uplink subframes whose receiving states are NACK is equal to a first preset threshold, or when a percentage of a quantity of uplink subframes whose receiving states are NACK in a quantity of all uplink subframes is equal to a second preset threshold, increase or decrease the CWS.

Optionally, the processor 520 is further configured to:

determine a CWS of a third uplink burst of the UE according to the reference subframe before the CWS of the second uplink burst is determined; and determine that the CWS of the second uplink burst is equal to the CWS of the third uplink burst.

The first uplink burst, the second uplink burst, and the third uplink burst are discontinuous in time, the third uplink burst is between the first uplink burst and the second uplink burst, and the third uplink burst includes at least one uplink subframe.

Moreover, the apparatus 500 may further include a memory 530 and a receiver 540 that are coupled to the processor 520. The memory 530 may be configured to store an instruction, or may be configured to store a frame structure or the like. The receiver 540 may be configured to receive an instruction or the like. The processor 520 may be a baseband processor, a communication processor, a digital signal processor, an application-specific integrated circuit, or the like. The processor 520 is configured to execute the instruction stored in the memory 530.

It should be understood that the transmitter 510, the processor 520, the memory 530, the receiver 540, and the like in the apparatus 500 may be connected by using a bus system 550.

It should be understood that the apparatus 500 in FIG. 21 may be configured to perform the method according to the embodiments of the present disclosure, and the foregoing and other operations and/or functions of the parts in the base station are separately used to implement corresponding procedures in the methods on a side of the base station in FIG. 1. For brevity, details are not described herein again.

Figure 22:
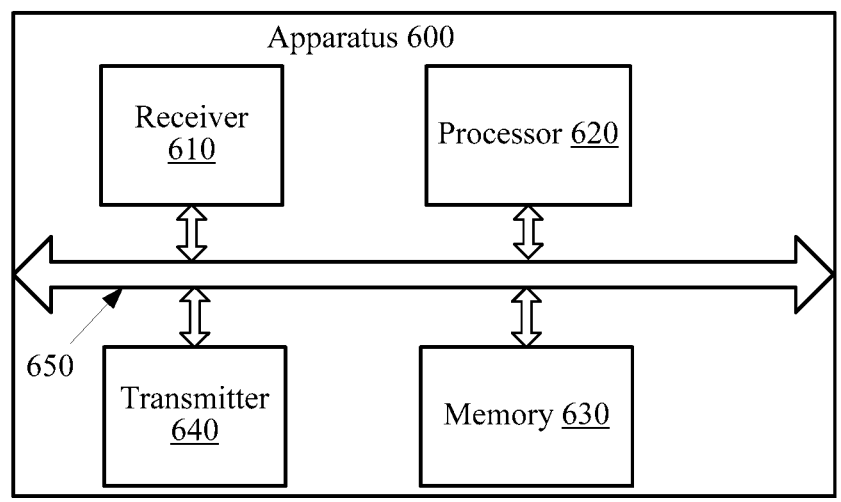
FIG. 22 is still another schematic block diagram of an apparatus for determining contention window information according to an embodiment of the present disclosure.

FIG. 22 shows an apparatus 600 for determining contention window information according to an embodiment of the present disclosure. The apparatus may be a user equipment. The apparatus 600 shown in FIG. 22 may include a processor 620 and a receiver 610.

The receiver 610 is configured to receive at least one piece of control signaling sent by a base station for scheduling at least one uplink subframe in a second uplink burst, where each of the at least one piece of control signaling includes contention window information, a clear channel assessment CCA backoff counter initial value generated based on contention window information, or a hybrid automatic repeat request HARQ indication, and the contention window information includes a contention window size CWS, a contention window time, or signaling instructing the UE to trigger a CWS adjustment.

The processor 620 is configured to: determine a CCA backoff counter initial value of the second uplink burst according to the at least one piece of control signaling, and perform CCA for the second uplink burst according to the CCA backoff counter initial value.

Optionally, the processor 620 is further configured to: determine a CCA backoff counter initial value of a first uplink subframe of the second uplink burst according to contention window information included in control signaling closest to the second uplink burst and before the second uplink burst or a CCA backoff counter initial value generated based on the contention window information; or determine a CCA backoff counter initial value of a first uplink subframe of the second uplink burst according to contention window information included in control signaling of the first uplink subframe in the second uplink burst or a CCA backoff counter initial value generated based on the contention window information.

Optionally, the processor 620 is further configured to: determine a CWS of the second uplink burst according to a HARQ indication in the at least one piece of control signaling for at least one uplink subframe in a reference subframe; and determine the CCA backoff counter initial value of the second uplink burst according to the CWS.

The reference subframe includes at least one uplink subframe in at least one first uplink burst of the UE, the first uplink burst is before the second uplink burst, the second uplink burst and the first uplink burst are discontinuous in time, the first uplink burst includes at least one uplink subframe, and the second uplink burst includes at least one uplink subframe.

Optionally, the processor 620 is further configured to:

when the HARQ indication for the at least one uplink subframe in the reference subframe is received, and at least one HARQ indication is a retransmission indication, increase the CWS;

when a HARQ indication for each uplink subframe in the reference subframe is received, and each HARQ indication is an initial transmission indication, decrease the CWS;

when no HARQ indication for each uplink subframe in the reference subframe is received, but the HARQ indication for the at least one uplink subframe in the reference subframe is received, and each HARQ indication is an initial transmission indication, maintain the CWS unchanged or decrease the CWS; or when the HARQ indication for the at least one uplink subframe in the reference subframe is not received, maintain the CWS unchanged or decrease the CWS.

Optionally, the processor 620 is further configured to:

determine a CWS of a third uplink burst of the UE according to the reference subframe before the CWS of the second uplink burst is determined; and determine that the CWS of the second uplink burst is equal to the CWS of the third uplink burst.

The first uplink burst, the second uplink burst, and the third uplink burst are discontinuous in time, the third uplink burst is between the first uplink burst and the second uplink burst, and the third uplink burst includes at least one uplink subframe.

Moreover, the apparatus 600 may further include a memory 630 and a transmitter 640 that are coupled to the processor 620. The memory 630 may be configured to store an instruction, or may be configured to store a frame structure or the like. The transmitter 640 may be configured to send an instruction, information, or the like. The processor 610 may be a baseband processor, a communication processor, a digital signal processor, an application-specific integrated circuit, or the like. The processor 620 is configured to execute the instruction stored in the memory 630.

It should be understood that the receiver 610, the processor 620, the memory 630, the transmitter 640, and the like in the apparatus 600 may be connected by using a bus system 650.

It should be understood that the apparatus 600 in FIG. 22 may be configured to perform the method according to the embodiments of the present disclosure, and the foregoing and other operations and/or functions of the parts in the user equipment are separately used to implement corresponding procedures in the methods on a side of the user equipment in FIG. 1. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for determining contention window information, comprising:
   receiving, by a user equipment (UE), control signaling from a base station for scheduling at least one uplink subframe, wherein the control signaling comprises a hybrid automatic repeat request (HARQ) indication, and wherein the HARQ indication indicates an initial transmission or a retransmission;
   determining, by the UE, a contention window size (CWS) of a second uplink burst according to the HARQ indication in the control signaling for at least one uplink subframe in a reference subframe, wherein the second uplink burst comprises at least one uplink subframe, the reference subframe comprises at least one uplink subframe in a first uplink burst of the UE, the first uplink burst is before the second uplink burst, the second uplink burst and the first uplink burst are discontinuous in time, and the first uplink burst comprises at least one uplink subframe;
   determining, by the UE, a clear channel assessment (CCA) backoff counter initial value of the second uplink burst according to the CWS of the second uplink burst; and
   performing, by the UE, CCA for the second uplink burst according to the CCA backoff counter initial value of the second uplink burst.

2. The method according to claim 1, wherein the first uplink burst is a first uplink burst in which each uplink subframe is sent by the UE.

3. The method according to claim 1, wherein the reference subframe is at least one uplink subframe sent by the UE in the first uplink burst.

4. The method according to claim 1, wherein before the determining the CWS of the second uplink burst, the method further comprises:
   determining, by the UE, a CWS of a third uplink burst of the UE according to the reference subframe; and
   determining that the CWS of the second uplink burst is equal to the CWS of the third uplink burst,
   wherein the first uplink burst, the second uplink burst, and the third uplink burst are discontinuous in time, the third uplink burst is between the first uplink burst and the second uplink burst, and the third uplink burst comprises at least one uplink subframe.

5. The method according to claim 4, wherein a time interval between the at least one uplink subframe in the third uplink burst and a first uplink subframe in the second uplink burst is less than first preset duration.

6. The method according to claim 4, wherein the control signaling is a control signaling that is closest to the second uplink burst before the second uplink burst and that is received by the UE, wherein:
   a moment at which the UE receives the control signaling is earlier than the at least one uplink subframe in the third uplink burst; or
   a moment at which the UE receives the control signaling is not earlier than the at least one uplink subframe in the third uplink burst, and a time interval between the at least one uplink subframe in the third uplink burst and the moment at which the UE receives the control signaling is less than second preset duration.

7. The method according to claim 1, wherein the reference subframe is a first uplink subframe, or a last uplink subframe in uplink subframes that are sent by the UE in the first uplink burst.

8. An apparatus for determining contention window information, comprising:
   a receiver configured to receive control signaling from a base station for scheduling at least one uplink subframe, wherein the control signaling comprises a hybrid automatic repeat request (HARQ) indication, and wherein the HARQ indication indicates an initial transmission or a retransmission; and
   a processor configured to:
      determine a contention window size (CWS) of a second uplink burst according to the HARQ indication in the control signaling for at least one uplink subframe in a reference subframe, wherein the second uplink burst comprises at least one uplink subframe, the reference subframe comprises at least one uplink subframe in a first uplink burst of the UE, the first uplink burst is before the second uplink burst, the second uplink burst and the first uplink burst are discontinuous in time, and the first uplink burst comprises at least one uplink subframe;
      determine a clear channel assessment (CCA) backoff counter initial value of the second uplink burst according to the CWS of the second uplink burst; and
      perform CCA for the second uplink burst according to the CCA backoff counter initial value of the second uplink burst.

9. The apparatus according to claim 8, wherein the first uplink burst is a first uplink burst in which each uplink subframe is sent by the apparatus.

10. The apparatus according to claim 8, wherein the reference subframe is at least one uplink subframe sent by the apparatus in the first uplink burst.

11. The apparatus according to claim 8, wherein the processor is further configured to:
    determine a CWS of a third uplink burst of the apparatus according to the reference subframe before determining the CWS of the second uplink burst, wherein the second uplink burst and the third uplink burst correspond to the reference subframe, and the CWS of the second uplink burst is equal to the CWS of the third uplink burst,
    wherein the first uplink burst, the second uplink burst, and the third uplink burst are discontinuous in time, the third uplink burst is between the first uplink burst and the second uplink burst, and the third uplink burst comprises at least one uplink subframe.

12. The apparatus according to claim 11, wherein a time interval between the at least one uplink subframe in the third uplink burst and a first uplink subframe in the second uplink burst is less than first preset duration.

13. The apparatus according to claim 11, wherein the control signaling is a control signaling that is closest to the second uplink burst before the second uplink burst and that is received by the apparatus, and wherein:
    a moment at which the apparatus receives the control signaling is earlier than the at least one uplink subframe in the third uplink burst; or
    a moment at which the apparatus receives the control signaling is not earlier than the at least one uplink subframe in the third uplink burst, and a time interval between the at least one uplink subframe in the third uplink burst and the moment at which the apparatus receives the control signaling is less than second preset duration.

14. The apparatus according to claim 8, wherein the reference subframe is a first uplink subframe, or a last uplink subframe in uplink subframes that are sent by the UE in the first uplink burst.

15. A non-transitory computer readable storage medium storing program codes that, when executed by a processor, cause an apparatus to determine contention window information, by performing the steps of:
- receiving control signaling from a base station for scheduling at least one uplink subframe, wherein the control signaling comprises a hybrid automatic repeat request (HARQ) indication, and wherein the HARQ indication indicates an initial transmission or a retransmission;
- determining a contention window size (CWS) of a second uplink burst according to the HARQ indication in the control signaling for at least one uplink subframe in a reference subframe, wherein the second uplink burst comprises at least one uplink subframe, the reference subframe comprises at least one uplink subframe in a first uplink burst of the apparatus, the first uplink burst is before the second uplink burst, the second uplink burst and the first uplink burst are discontinuous in time, and the first uplink burst comprises at least one uplink subframe;
- determining a clear channel assessment (CCA) backoff counter initial value of the second uplink burst according to the CWS of the second uplink burst; and
- performing CCA for the second uplink burst according to the CCA backoff counter initial value of the second uplink burst.

16. The non-transitory computer readable storage medium according to claim 15, wherein the first uplink burst is a first uplink burst in which each uplink subframe is sent by the apparatus.

17. The non-transitory computer readable storage medium according to claim 15, wherein the reference subframe is at least one uplink subframe sent by the apparatus in the first uplink burst.

18. The non-transitory computer readable storage medium according to claim 15, wherein the reference subframe is a first uplink subframe, or a last uplink subframe in uplink subframes that are sent by the apparatus in the first uplink burst.

19. The non-transitory computer readable storage medium according to claim 15, the steps further comprising:
- determining a CWS of a third uplink burst of the apparatus according to the reference subframe before determining the CWS of the second uplink burst, wherein the second uplink burst and the third uplink burst correspond to the reference subframe, and the CWS of the second uplink burst is equal to the CWS of the third uplink burst,
- wherein the first uplink burst, the second uplink burst, and the third uplink burst are discontinuous in time, the third uplink burst is between the first uplink burst and the second uplink burst, and the third uplink burst comprises at least one uplink subframe.

20. The non-transitory computer readable storage medium according to claim 19, wherein the control signaling is a control signaling that is closest to the second uplink burst before the second uplink burst and that is received by the apparatus, wherein:
- a moment at which the apparatus receives the control signaling is earlier than the at least one uplink subframe in the third uplink burst; or
- a moment at which the apparatus receives the control signaling is not earlier than the at least one uplink subframe in the third uplink burst, and a time interval between the at least one uplink subframe in the third uplink burst and the moment at which the apparatus receives the control signaling is less than second preset duration.

* * * * *